United States Patent
Bakunov et al.

(10) Patent No.: US 12,488,445 B2
(45) Date of Patent: Dec. 2, 2025

(54) AUTOMATIC IMAGE QUALITY EVALUATION

(71) Applicant: Snap Inc., Santa Monica, CA (US)

(72) Inventors: Mykyta Bakunov, Adliswil (CH); Arnab Ghosh, Oxford (GB); Pavel Savchenkov, London (GB); Sergey Smetanin, London (GB); Jian Ren, Marina Del Ray, CA (US)

(73) Assignee: SNAP INC., Santa Monica, CA (US)

( * ) Notice: Subject to any disclaimer, the term of this patent is extended or adjusted under 35 U.S.C. 154(b) by 155 days.

(21) Appl. No.: 18/176,843

(22) Filed: Mar. 1, 2023

(65) Prior Publication Data
US 2024/0296535 A1 Sep. 5, 2024

(51) Int. Cl.
*G06T 7/00* (2017.01)
*G06F 40/126* (2020.01)
(Continued)

(52) U.S. Cl.
CPC .......... *G06T 7/0002* (2013.01); *G06F 40/126* (2020.01); *G06F 40/40* (2020.01);
(Continued)

(58) Field of Classification Search
None
See application file for complete search history.

(56) References Cited

U.S. PATENT DOCUMENTS

| 7,214,065 B2 | 5/2007 | Fitzsimmons, Jr. |
| 8,867,849 B1 | 10/2014 | Kirkham et al. |

(Continued)

FOREIGN PATENT DOCUMENTS

| CN | 115391588 | 11/2022 |
| EP | 3698258 | 8/2020 |

(Continued)

OTHER PUBLICATIONS

Li, Junnan, "BLIP: Bootstrapping Language-Image Pre-training for Unified Vision-Language Understanding and Generation", arXiv: 2201.12086v2 [cs.CV], (Feb. 15, 2022), 12 pgs.

(Continued)

*Primary Examiner* — Jeffrey J Chow
(74) *Attorney, Agent, or Firm* — SCHWEGMAN LUNDBERG & WOESSNER, P.A.

(57) ABSTRACT

Examples disclosed herein describe techniques for automatic image quality evaluation. A first set of images generated by a first automated image generator and a second set of images generated by a second automated image generator are accessed. A first machine learning model generates a first quality indicator for each image in the first set of images and the second set of images. A second machine learning model generates a second quality indicator for each image in the first set of images and the second set of images. Based on the generated indicators, a first image from the first set of images and a second image from the second set of images are automatically selected and compared. A first ranking of the first automated image generator and the second automated image generator is generated based on the comparison, and ranking data is caused to be presented on a device.

20 Claims, 15 Drawing Sheets

(51) Int. Cl.
  *G06F 40/40*  (2020.01)
  *G06T 11/00*  (2006.01)
(52) U.S. Cl.
  CPC .... *G06T 11/00* (2013.01); *G06T 2207/20081* (2013.01); *G06T 2207/20084* (2013.01); *G06T 2207/30168* (2013.01)

(56) References Cited

U.S. PATENT DOCUMENTS

| | | | |
|---|---|---|---|
| 10,496,924 | B1 | 12/2019 | Highnam et al. |
| 11,445,148 | B1 | 9/2022 | Øhrn |
| 11,809,688 | B1 | 11/2023 | Parasnis et al. |
| 11,947,893 | B1 | 4/2024 | Seth |
| 12,169,626 | B2 | 12/2024 | Zakharov et al. |
| 12,205,207 | B2 | 1/2025 | Smetanin et al. |
| 2014/0051402 | A1 | 2/2014 | Qureshi |
| 2014/0344712 | A1 | 11/2014 | Okazawa et al. |
| 2016/0125269 | A1* | 5/2016 | Lee ............ G06T 7/0002 382/219 |
| 2016/0188153 | A1 | 6/2016 | Lerner et al. |
| 2019/0295302 | A1* | 9/2019 | Fu ............ G06T 11/00 |
| 2020/0267182 | A1 | 8/2020 | Highnam et al. |
| 2021/0042796 | A1 | 2/2021 | Khoury et al. |
| 2021/0209184 | A1 | 7/2021 | Huang et al. |
| 2021/0352460 | A1 | 11/2021 | Rohde et al. |
| 2022/0036153 | A1 | 2/2022 | O'malia et al. |
| 2022/0101578 | A1 | 3/2022 | Bedi et al. |
| 2022/0114698 | A1 | 4/2022 | Liu |
| 2023/0025835 | A1 | 1/2023 | Moriya et al. |
| 2023/0054174 | A1 | 2/2023 | Peled et al. |
| 2023/0177878 | A1 | 6/2023 | Sekar et al. |
| 2023/0215441 | A1 | 7/2023 | Wu |
| 2023/0222703 | A1 | 7/2023 | Baheti et al. |
| 2023/0230198 | A1 | 7/2023 | Zhang et al. |
| 2023/0260164 | A1 | 8/2023 | Yuan et al. |
| 2023/0262102 | A1 | 8/2023 | Das et al. |
| 2023/0281789 | A1 | 9/2023 | Sudarsky et al. |
| 2023/0298224 | A1 | 9/2023 | Aggarwal et al. |
| 2023/0342284 | A1 | 10/2023 | Easton et al. |
| 2024/0135610 | A1 | 4/2024 | Kolkin et al. |
| 2024/0161258 | A1* | 5/2024 | Maschmeyer ............ G06T 7/70 |
| 2024/0169622 | A1 | 5/2024 | Xie et al. |
| 2024/0193821 | A1 | 6/2024 | Denison |
| 2024/0295953 | A1 | 9/2024 | Zakharov et al. |
| 2024/0296606 | A1 | 9/2024 | Smetanin et al. |
| 2024/0297957 | A1 | 9/2024 | Bakunov et al. |
| 2024/0362830 | A1* | 10/2024 | Zhang ............ G06N 3/08 |

FOREIGN PATENT DOCUMENTS

| | | |
|---|---|---|
| WO | 2024182144 | 9/2024 |
| WO | 2024182169 | 9/2024 |
| WO | 2024182240 | 9/2024 |
| WO | 2024182438 | 9/2024 |

OTHER PUBLICATIONS

Schuhmann, Christoph, "CLIP+MLP Aesthetic Score Predictor", [Online] Retrieved from the Internet: <URL: https://github.com/christophschuhmann/improved-aesthetic-predictor>, (Jun. 30, 2022), 2 pgs.
Vincent, James, "TikTok Now Offers a Very Basic Text-To-Image AI Generator Directly in The App", The Verge, (Aug. 15, 2022), 4 pgs.
"U.S. Appl. No. 18/116,003, Non Final Office Action mailed Sep. 26, 2023", 26 pgs.
"U.S. Appl. No. 18/176,971, Non Final Office Action mailed Dec. 19, 2023", 19 pgs.
"Midjourney Banned Words: Understanding the AI image Generator's Restrictions", [Online]. Retrieved from the Internet: <https://midjourney.co.in/midjourney-banned-words-understanding-the-ai-image-generators-restrictions/>, (Feb. 24, 2023), 9 pgs.
"AI Prompt Art Maker Generator", Emoji World, [Online]. Retrieved from the Internet: <https://apps.apple.com/us/app/ai-prompt-art-maker-generator/id6444807049>, (Dec. 6, 2022), 5 pgs.
"U.S. Appl. No. 18/116,003, Response filed Dec. 18, 2023 to Non Final Office Action mailed Sep. 26, 2023", 11 pgs.
"U.S. Appl. No. 18/176,971, Response filed Mar. 15, 2024 to Non Final Office Action mailed Dec. 19, 2023", 13 pgs.
"U.S. Appl. No. 18/116,003, Final Office Action mailed Mar. 20, 2024", 27 pgs.
"U.S. Appl. No. 18/116,003, Response filed May 15, 2024 to Final Office Action mailed Mar. 20, 2024", 9 pgs.
"International Application Serial No. PCT/US2024/017140, International Search Report mailed May 28, 2024", 4 pgs.
"International Application Serial No. PCT/US2024/017140, Written Opinion mailed May 28, 2024", 5 pgs.
"International Application Serial No. PCT/US2024/016539, International Search Report mailed May 31, 2024", 3 pgs.
"International Application Serial No. PCT/US2024/016539, Written Opinion mailed May 31, 2024", 5 pgs.
"U.S. Appl. No. 18/176,971, Notice of Allowance mailed Jun. 3, 2024", 6 pgs.
"International Application Serial No. PCT/US2024/017545, International Search Report mailed Jun. 7, 2024", 3 pgs.
"International Application Serial No. PCT/US2024/017545, Written Opinion mailed Jun. 7, 2024", 7 pgs.
"U.S. Appl. No. 18/116,003, Notice of Allowance mailed Jun. 7, 2024", 7 pgs.
"International Application Serial No. PCT/US2024/016223, International Search Report mailed Jun. 18, 2024", 4 pgs.
"International Application Serial No. PCT/US2024/016223, Written Opinion mailed Jun. 18, 2024", 7 pgs.
Chen, Shoufa, "DiffusionDet: Diffusion Model for Object Detection", arxiv.org, Cornell University Library, 201, Olin Library Cornell University Ithaca, NY 1485, (Nov. 17, 2022), 16 pgs.
Cheng, Jiaxin, "LayoutDiffuse: Adapting Foundational Diffusion Models for Layout-to-Image Generation", arxiv.org, Cornell University Library, 201 Olin Library Cornell University Ithaca, NY 14853, (Feb. 16, 2023), 15 pgs.
Dinh, Tan M., "TISE: Bag of Metrics for Text-to-Image Synthesis Evaluation", arxiv.org, Cornell University Library, 201 Olin Library Cornell University Ithaca, NY 14853, (Jul. 19, 2022), 34 pgs.
Gu, Shuyang, "GIQA: Generated Image Quality Assessment", arxiv.org, Cornell University Library, 201 Olin Library Cornell University Ithaca, NY 14853, (Mar. 19, 2020), 26 pgs.
Hao, Yaru, "Optimizing Prompts for Text-to-Image Generation", arxiv.org, Cornell University Library, 201 Olin Library Cornell University Ithaca, NY 14853, (Dec. 19, 2022), 16 pgs.
Li, Yuheng, "GLIGEN: Open-Set Grounded Text-to-Image Generation", arxiv.org, Cornell University Library, 201, Olin Library Cornell University Ithaca, NY, 14853, (Jan. 17, 2023), 21 pgs.
Oppenlaender, Jonas, "A taxonomy of prompt modifiers for text-to-image generation", arXiv preprint arXiv:2204.13988v2., (Jul. 31, 2022), 18 pgs.
Palli, Praneeth, "Want To Change Wallpaper For A Specific Chat on WhatsApp? Follow These Steps", [Online]. Retrieved from the Internet: <https://in.mashable.com/tech/31833/want-to-change-wallpaper-for-a-specific-chat-on-whatsapp-follow-these-steps>, (May 17, 2022), 6 pgs.
Yu, Wenxin, "Blind Image Quality Assessment for a Single Image From Text to Image Synthesis", IEEE Access, IEEE, USA, vol. 9, (Jul. 1, 2021), 12 pgs.
"U.S. Appl. No. 18/116,003, Notice of Allowance mailed Jul. 26, 2024", 7 pgs.
"U.S. Appl. No. 18/176,971, Notice of Allowance mailed Sep. 17, 2024", 6 pgs.
"U.S. Appl. No. 18/116,003, Corrected Notice of Allowability mailed Nov. 6, 2024", 2 pgs.
"U.S. Appl. No. 17/844,587, Corrected Notice of Allowability mailed Dec. 16, 2024", 3 pgs.

* cited by examiner

| QUERY | OLD MODEL | NEW MODEL |
|---|---|---|
| CITY OF MANITOU SPRINGS IS ONE OF REVIEW. | | |
| THE COMMUNITY IMPERATIVE: ENGAGING IN CONVERSATIONS RATHER THAN DISSEMINATING INFORMATION | | |
| DESCRIBE AN ITEM THAT YOU RECEIVED AND BECAME HAPPY ABOUT. | | |

FIG. 8

AUTOMATIC IMAGE QUALITY EVALUATION

TECHNICAL FIELD

The subject matter disclosed herein relates, generally, to the field of automated image generation. More specifically, but not exclusively, the subject matter relates to automatic evaluation of the quality of images generated by automated image generation systems and to automatic evaluation of the performance of automated image generators.

BACKGROUND

The field of automated image generation, including artificial intelligence (AI) driven image generation, continues to grow. Machine learning models known as text-to-image models can be trained to analyze natural language descriptions (referred to herein as "prompts") and automatically generate corresponding visual outputs. This process can be referred to as automatic, text-guided image generation.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 8 is a table illustrating examples that represent images generated by two different models based on queries, according to some examples.

DETAILED DESCRIPTION

Figure 1:
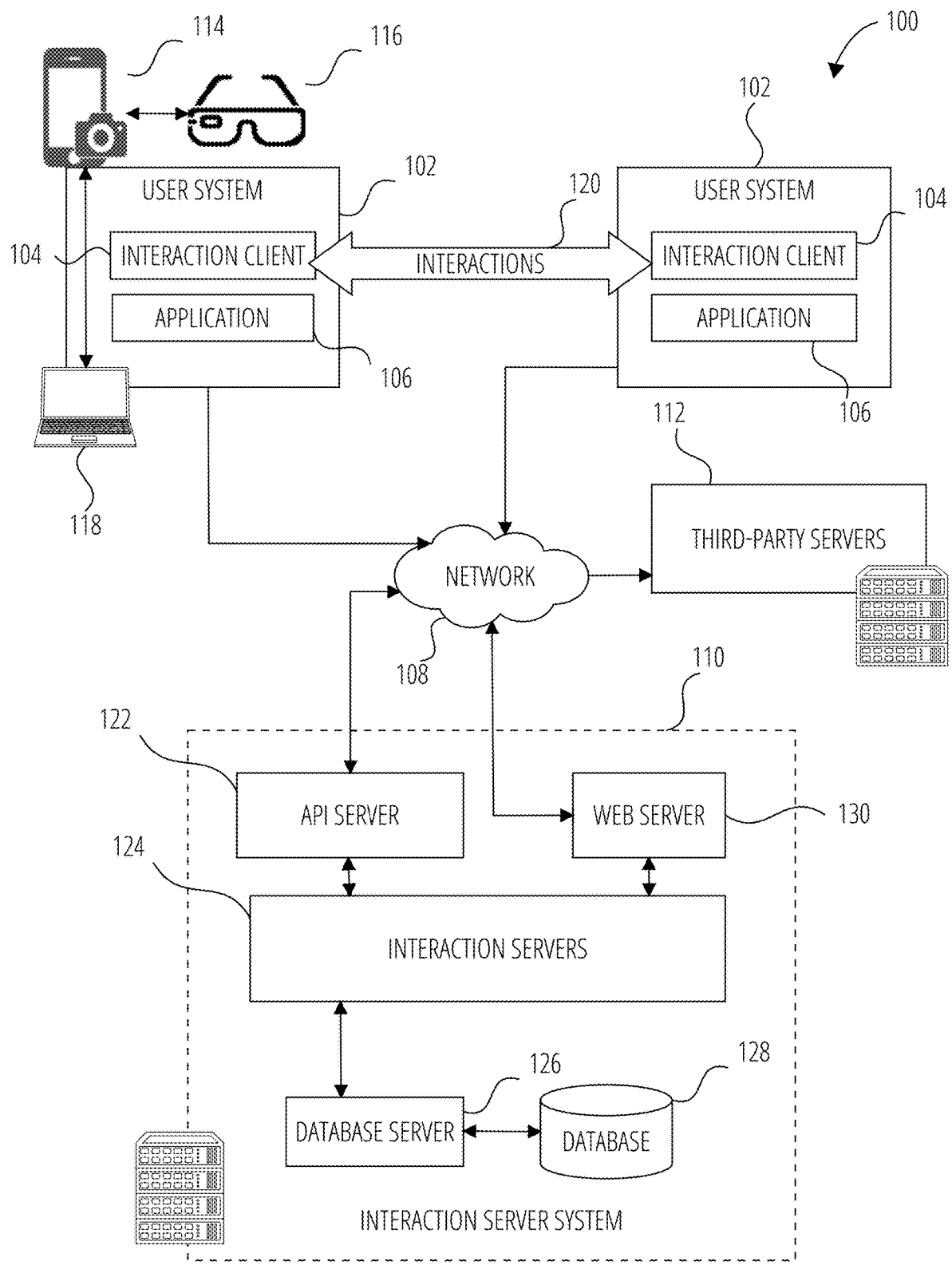
FIG. 1 is a diagrammatic representation of a networked environment in which the present disclosure may be deployed, according to some examples.

Examples of the present disclosure allow for automatic image quality evaluation. A machine learning framework is provided for evaluating text-guided, automatically generated images. In some examples, images can be evaluated, and performance of multiple generative models can be compared in a fully, or near-fully, automated manner.

Automated image generators utilizing text-to-image technology, e.g., generators built on diffusion models or Generative Adversarial Networks (GANs), may be able to generate high-fidelity images in response to a user's prompts. It may be desirable to evaluate the quality of images generated by a particular model, e.g., to compare its performance to that of another model. It may also be desirable to compare images within a set of images generated by the same model. A number of metrics can be used to evaluate the quality of an image generated by an automated image generator. For example, an image can be assigned an aesthetic quality score (indicative of its aesthetic appeal) or an alignment score (indicative of its alignment with the original prompt).

In some examples, images are automatically assessed along multiple dimensions, e.g., by automatically determining an aesthetic quality score, an alignment score, and a visual realism score for each image. Systems and methods described herein also automatically interpret such scores. For example, a highest-scoring image from one set of images (e.g., images generated by a first model) can be automatically selected and then evaluated against a highest-scoring image from another set of images (e.g., images generated by a second model) to generate one or more rankings. Images or models may be ranked using combined scores that take multiple metrics into account, or may be ranked separately for each metric.

Examples described herein may automate an evaluation process, while still processing or selecting images in a relatively "natural" way, e.g., by selecting the best image from each initial set of images, and then comparing the best images to each other. This may lead to results that are not only comprehensive or accurate, but also sensible from a human perception point of view.

In some examples, a first set of images generated by a first automated image generator and a second set of images generated by a second automated image generator are accessed. The first set of images and the second set of images are both automatically generated based on a first text prompt. The automated image generators may be text-to-image machine learning models, such as diffusion models.

A first machine learning model, that is trained to evaluate image quality using a first quality metric (e.g., aesthetic quality, alignment, or visual realism), may generate a first quality indicator for each image in the first set of images and for each image in the second set of images. A second machine learning model, that is trained to evaluate image quality using a second quality metric (being a different metric from the metric assessed by the first machine learning model) may generate a second quality indicator for each image in the first set of images and for each image in the second set of images. Based on the first quality indicators and the second quality indicators, a first image from the first set of images and a second image from the second set of images may be automatically selected. These images may be the highest-scoring, or top-scoring, images from each set. In other examples, a subset of images from the first set and a subset of images from the second set may be automatically selected for further analysis or comparison.

A first ranking may be generated based on a comparison between the selected first image and the selected second image. The first ranking is a ranking of the first automated image generator and the second automated image generator. For example, the first ranking may be based on the first quality metric (e.g., ranking the automated image generators based on their aesthetic quality performance), or based on the second quality metric (e.g., ranking the automated image generators based on their alignment scores). A third quality metric (e.g., visual realism) may be included in the automated evaluation, as described in some examples below.

In some examples, ranking data that is at least partially generated based on one or more rankings of these rankings or comparisons, may be presented on a device. Ranking may be performed for specific metrics. For example, a first ranking can be based on an automatic comparison between the first quality indicator generated for the first image and the first quality indicator generated for the second image (e.g., to compare aesthetic quality in the first image to aesthetic quality in the second image), while a second ranking can be based on an automatic comparison between the second quality indicator generated for the first image and the second quality indicator generated for the second image (e.g., to compare alignment of the first image to alignment of the second image). The ranking data may thus be generated using a plurality of these rankings.

A selected image, such as one of the first image and the second image referred to above, may be presented to a user on a user device. In some examples, a user transmits an image generation request via a user device. One or more automated image generators then generate a plurality of candidate images. An automated evaluation process may be used to select an image from the plurality of candidate images, e.g., an image determined to have a highest combined score across multiple quality metrics may be selected for presentation to the user.

An example technical problem of automating an image quality evaluation task may be addressed by techniques described herein. Automation of image quality evaluation may facilitate decision-making, e.g., by providing a consistent decision-making tool for selection of a generative model or hyperparameters for a particular use case.

Another example technical problem of reducing or eliminating manual evaluation tasks for automatically generated images may be addressed by techniques described herein. Manual evaluation of images (or other human input required in such a process) may be subjective or lead to inconsistent scoring, and it may thus be desirable to reduce or eliminate manual evaluation tasks.

Examples described herein may also lead to improved overall or average image quality and result in more efficient computing resource usage, e.g., by selecting higher quality images or models producing higher quality images, a system may reduce the number of image requests that typically need to be processed for a user to reach a satisfactory result. It will be appreciated that various metrics may be used to measure the "quality" of an image, and the manner in which "quality" is defined and evaluated may thus be user-defined. For example, certain applications may emphasize or require aesthetic quality, or "beautiful" images, thus requiring a metric for aesthetic quality to be considered when determining quality, while not requiring images to be visually realistic. Other applications may, for example, be less concerned with "beauty" and instead base image quality on whether an image is realistic and well-aligned with the original prompt.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Programming Interface (API) server 122, is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

System Architecture

Figure 2:
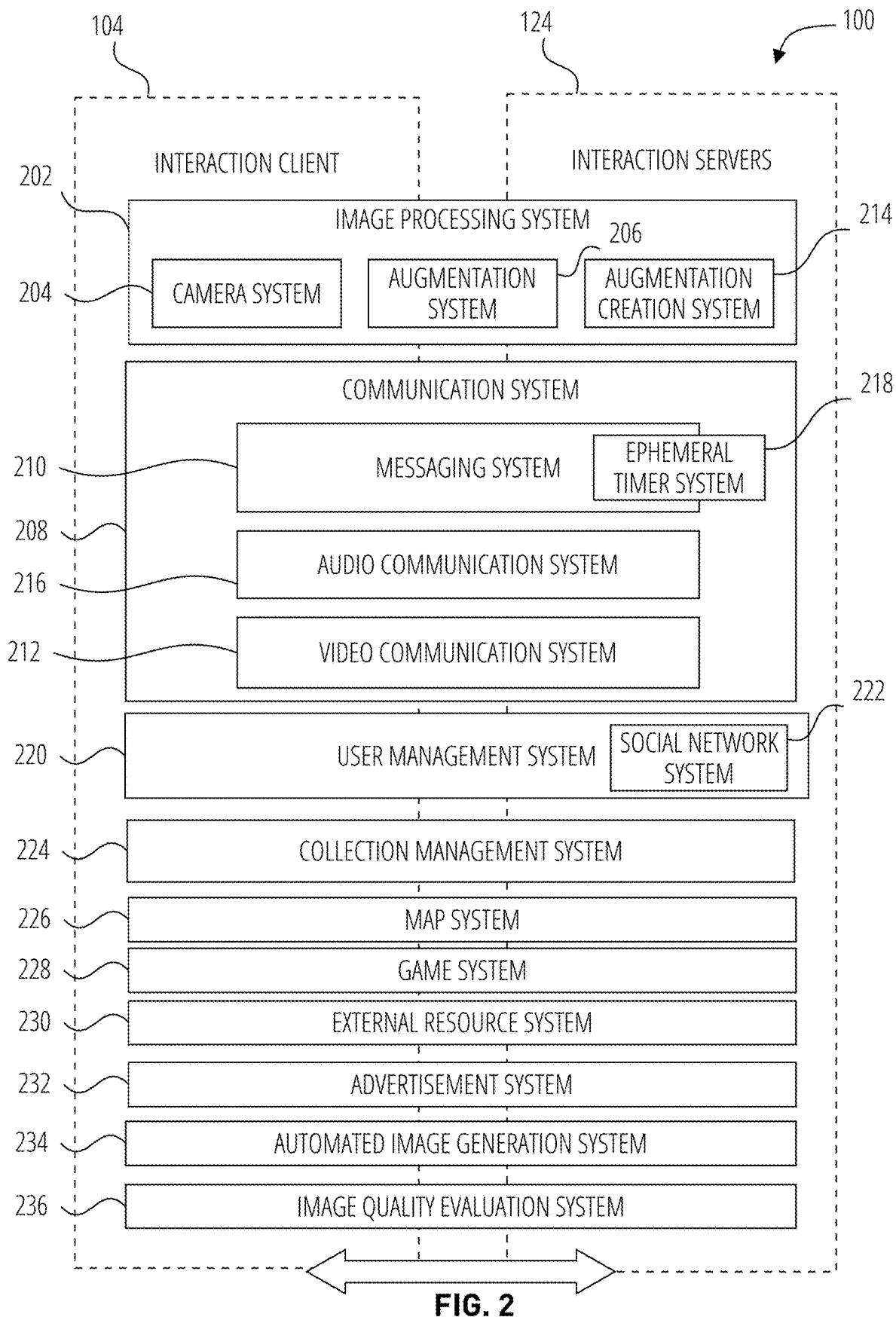
FIG. 2 is a diagrammatic representation of an interaction system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1202 of a user system 102. These augmentations are selected by the augmentation system 206 and presented to a user of an interaction client 104, based on a number of inputs and data, such as for example:

Geolocation of the user system 102; and
Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

An automated image generation system 234 enables a user to submit a prompt via the interaction client 104. In response, the automated image generation system 234 causes generation of an image corresponding to the prompt. This can be referred to as a text-guided, automatic image generation feature. For example, the automated image generation system 234 may include an automated image generator comprising a text-to-image machine learning model (or multiple models) or be communicatively coupled to one or more third-party automated image generators. Examples of generative machine learning models capable of generating images based on prompts include diffusion models and GANs. The automated image generation system 234 may receive a prompt originating from a user via a text input box in a user interface (e.g., a user interface presented on the mobile device 114). In some examples, the user is restricted to providing no more than a maximum number of characters, e.g., 150 characters, 250 characters, or 400 characters, in a prompt.

An automated image generator of the automated image generation system 234, such as a text-to-image machine learning model, may be trained on a training data set comprising a plurality of training records, with each training record comprising a training image and at least one corresponding text description for the training image.

An image quality evaluation system 236 is responsible for automated evaluations of image quality. The image quality evaluation system 236 may evaluate images and generative model performance based on one or more metrics, e.g., aesthetic quality, alignment, visual realism, Fréchet Inception Distance (FID), or combinations thereof. The image quality evaluation system 236 is, in some examples, not only responsible for generating image quality scores using machine learning models or rules-based techniques, but is also responsible for automatically interpreting such scores and ranking or classifying different images, models, or other sources. The image quality evaluation system 236 may further be used in data processing and preprocessing, such as the generation of suitable training data, sets of generative model prompts, reference images, reference scores, etc. The image quality evaluation system 236 may include multiple machine learning models, including deep learning models and other models, examples of which are described below.

In some examples, the automated image generation system 234 generates multiple candidate images and the automated image generation system 234 communicates with the image quality evaluation system 236 in order to obtain an automatic selection of one (or a subset) of the images for presentation to the user.

Data Architecture

Figure 3:
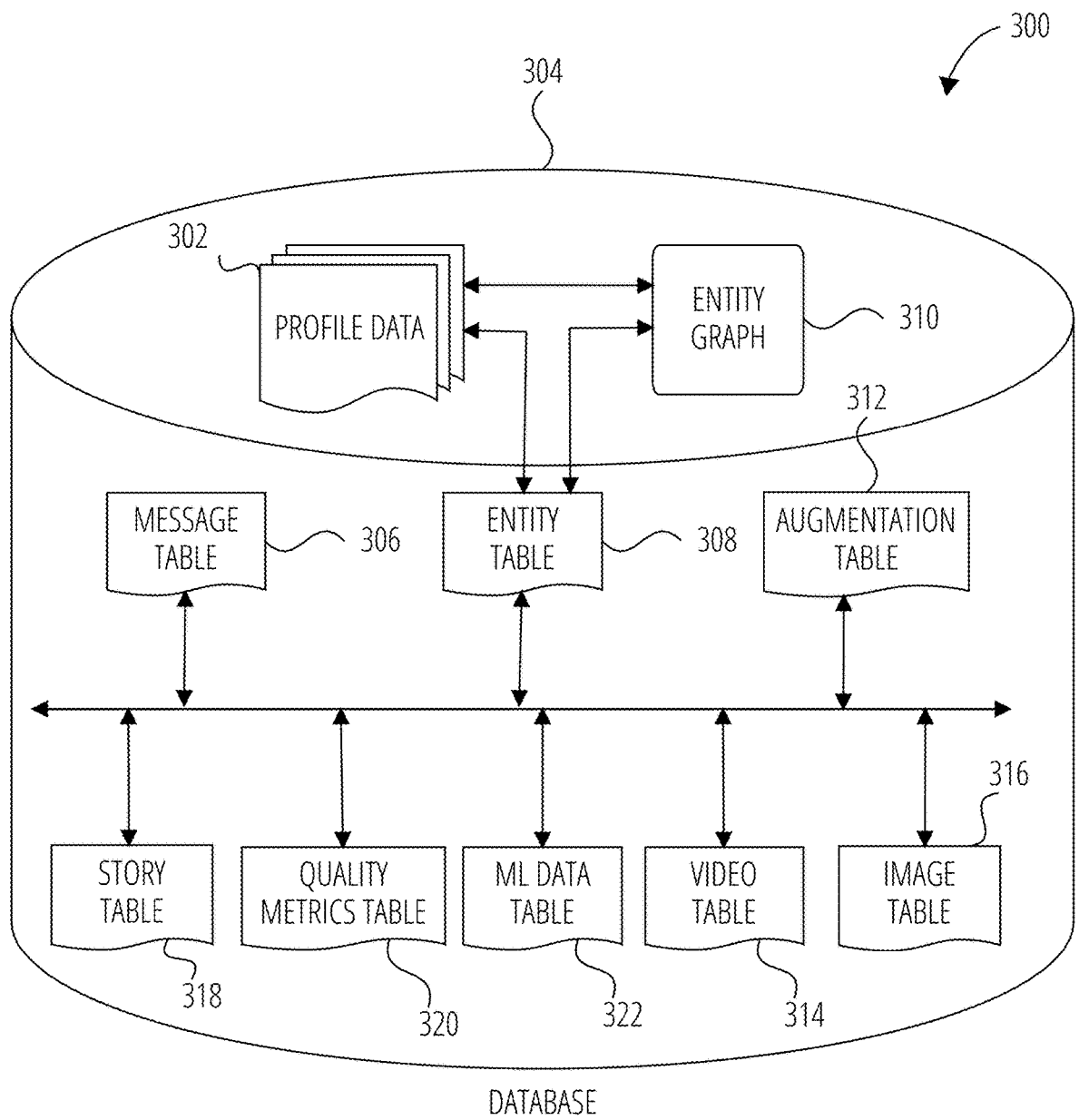
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 11.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314. The image table 316 may further store image data associated with images generated by or via the automated image generation system 234.

The quality metrics table 320 stores data relating to image quality metrics. For example, the quality metrics table 320 may include data relating to the manner in which various image quality metrics are to be calculated and scored by the image quality evaluation system 236 and data used for comparing and selecting images or models based on their quality scores. The quality metrics table 320 may also include historic data, e.g., quality scores generated during previous image quality evaluations, rankings generated for specific images, models, metrics, or combinations thereof.

The machine learning (ML) data table 322 stores data relating to one or more machine learning models. The data relating to a machine learning model can include training data, e.g., training data sets or larger data sets to be filtered to generate specific training data sets. The data may further include one or more of test data, model parameters, evaluation metrics, hyperparameters, feature and target data and metadata, data preprocessing settings, model architecture data, or version history data. Examples of machine learning models are described below.

Figure 4:
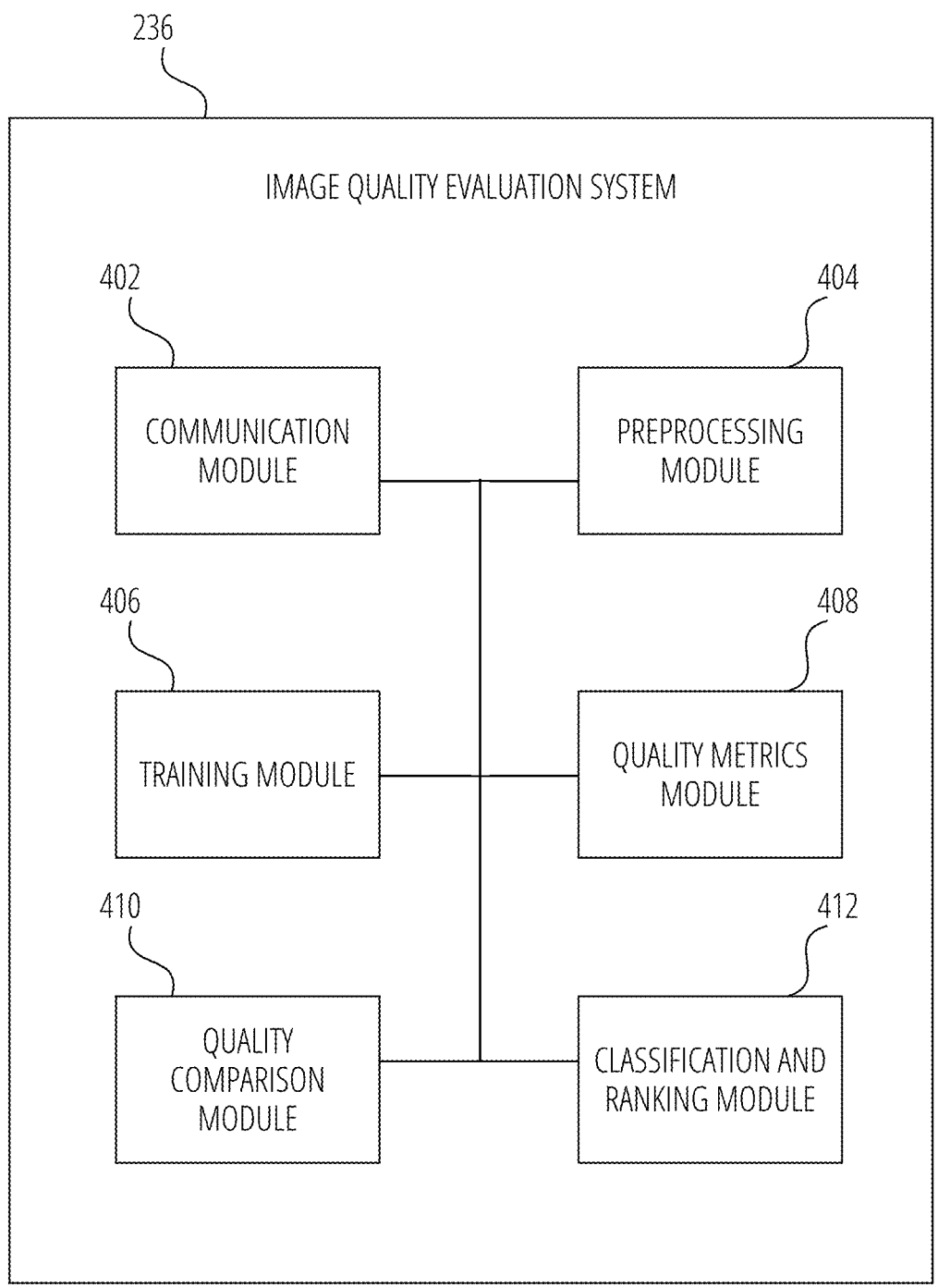
FIG. 4 is a block diagram illustrating components of an image quality evaluation system, according to some examples.

FIG. 4 is a block diagram illustrating components of an image quality evaluation system 236, according to some examples. Any one or more of the modules (which may also be referred to as components) described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various examples, modules described herein as being implemented within a single machine, database, or device may be distributed across multiple machines, databases, or devices. Also, while the image quality evaluation system 236 is shown in examples as being part of an interaction system such as the interaction system 100, in other examples the image quality evaluation system 236 can form part of other systems, such as content generation systems, image processing systems, automated assessment or ranking platforms, or machine learning systems, that may not necessarily provide user interaction features as described with reference to the interaction system 100.

Turning now specifically to FIG. 4, the image quality evaluation system 236 comprises a communication module 402, a preprocessing module 404, a training module 406, a quality metrics module 408, a quality comparison module 410, and a classification and ranking module 412.

The communication module 402 is responsible for enabling the image quality evaluation system 236 to access and receive data such as prompts and image data. The data may include training data. The communication module 402 is further responsible for enabling the image quality evaluation system 236 to transmit data, such as scores for various quality metrics, rankings of images, or rankings of generative models.

In some examples, certain processes are performed by external components (including some external to the interaction system 100), and the communication module 402 may communicate with these external components. For example, image generation may be provided by the automated image generation system 234 or by a third-party or other external automated image generator, and the communication module 402 may facilitate communications to and from these components. The communication module 402 may also communicate with the database 128 of the interaction system 100.

The preprocessing module 404 is configured to facilitate preprocessing of data sets, including filtering of large data sets to generate training data sets for specific image evaluation use cases, as well as data cleaning, scaling, normalization, or the like. The training module 406 is configured to facilitate machine learning model training. Specifically, in some examples, the training module 406 may be responsible for facilitating aspects of the training of various models (e.g., generative models, models for evaluating quality based on quality metrics, models for interpreting quality scores, models for generating rankings, or combinations thereof), such as automated training, hyperparameter tuning, model evaluation (e.g., evaluating metrics such as accuracy, precision, or recall), optimization, validation, or deployment. One or more of these tasks may be automated and/or may involve certain manual steps.

The quality metrics module 408 is responsible for applying one or more quality metrics to an image generated by an automated image generator. For example, the quality metrics module 408 may be used to automatically analyze an image to obtain scores, or predictions, for metrics such as aesthetic quality, alignment, visual realism, and others (e.g., reverse alignment), depending on the specific use case ("quality" be defined differently in different use cases). One or more trained machine learning models may be employed by the quality metrics module 408 to generate the required scores, examples of which are described in more detail below.

As used in this disclosure, the term "score" refers to any suitable score or rating, e.g., a numerical score, a percentage-based score, or a grading. A score may also be provided in the form of a classification (e.g., "high aesthetic quality" or "medium aesthetic quality") or a range (e.g., 60%-75%). Scores may be generated using continuous (interval) scales, binary scales (e.g., "yes," the image contains artifacts, or "no," the image does not contain artifacts), or combinations thereof. Accordingly, it will be appreciated that numerous types of scores, grades, classifications, or the like may be employed.

The quality comparison module 410 is responsible for further processing of the scores generated by the quality metrics module 408 (e.g., predictions of quality automatically generated by the quality metrics module 408). This may include combining or aggregating certain scores and comparing image scores along one or more dimensions. In some examples, the quality comparison module 410 generates a combined score for each image analyzed by the quality metrics module 408 and selects one or more images based on their combined scores. For example, the quality comparison module 410 may select a top-scoring image from a first set of images (e.g., generated by a first model) and a top-scoring image from a second set of images (e.g., generated by a second model). One or more trained machine learning models may be employed by the quality comparison module 410 to perform one or more of the functions mentioned above.

The classification and ranking module 412 may be used to compare images automatically (e.g., those selected by the quality comparison module 410), either in terms of their combined scores, or in terms of individual quality metrics, in order to generate useful insights into the relative performance of, for instance, different models. To this end, images or models may be classified or ranked in various ways. For example, the classification and ranking module 412 may automatically generate ranking data indicating that a first model outperforms a second model in terms of aesthetic quality, while the second model outperforms the first model in terms of visual realism. Ranking data, or images selected based on analyses performed by the image quality evaluation system 236, or combinations thereof, may be presented to a user via the communication module 402, e.g., on the mobile device 114 of a user of the interaction system 100. One or more trained machine learning models may be employed by the classification and ranking module 412 to perform one or more of the functions mentioned above.

As used in this disclosure, the term "aesthetic quality" refers to how visually appealing or pleasing an AI-generated image is to a human observer. It can be measured through subjective evaluation methods, such as surveys or human assessments, or through objective evaluation methods, such as using metrics such as Structural Similarity Index. Examples of automated techniques for assessing aesthetic quality and/or generating predictions of aesthetic quality are described herein. In some examples, an aesthetic quality score can be referred to, or include as a component, a visual realism score. In other examples, a visual realism score may be based on a different metric than a metric for aesthetic quality. For instance, visual realism may be based at least partially on whether an image contains artifacts, as described in some examples below.

As used in this disclosure, the term "alignment" refers to how well an AI-generated image corresponds to a given prompt, including, for example, how well the generated image captures the semantic and visual context of the prompt and/or how well it follows the intended category, context, or style. It can be measured using human evaluation or through objective metrics such as distance metrics. Examples of automated techniques for assessing alignment are described herein.

As used in this disclosure, the term "reverse alignment" refers to how well a caption, that was automatically generated for a given image using an automated caption generator (e.g., an image-to-text model), corresponds to the original prompt used to generate the given image. Reverse alignment can, for example, be calculated by encoding the caption and the original prompt into respective vectors (embeddings) and then comparing an embedding of the caption with that of the original prompt, e.g., by using a cosine similarity method.

Figure 5:
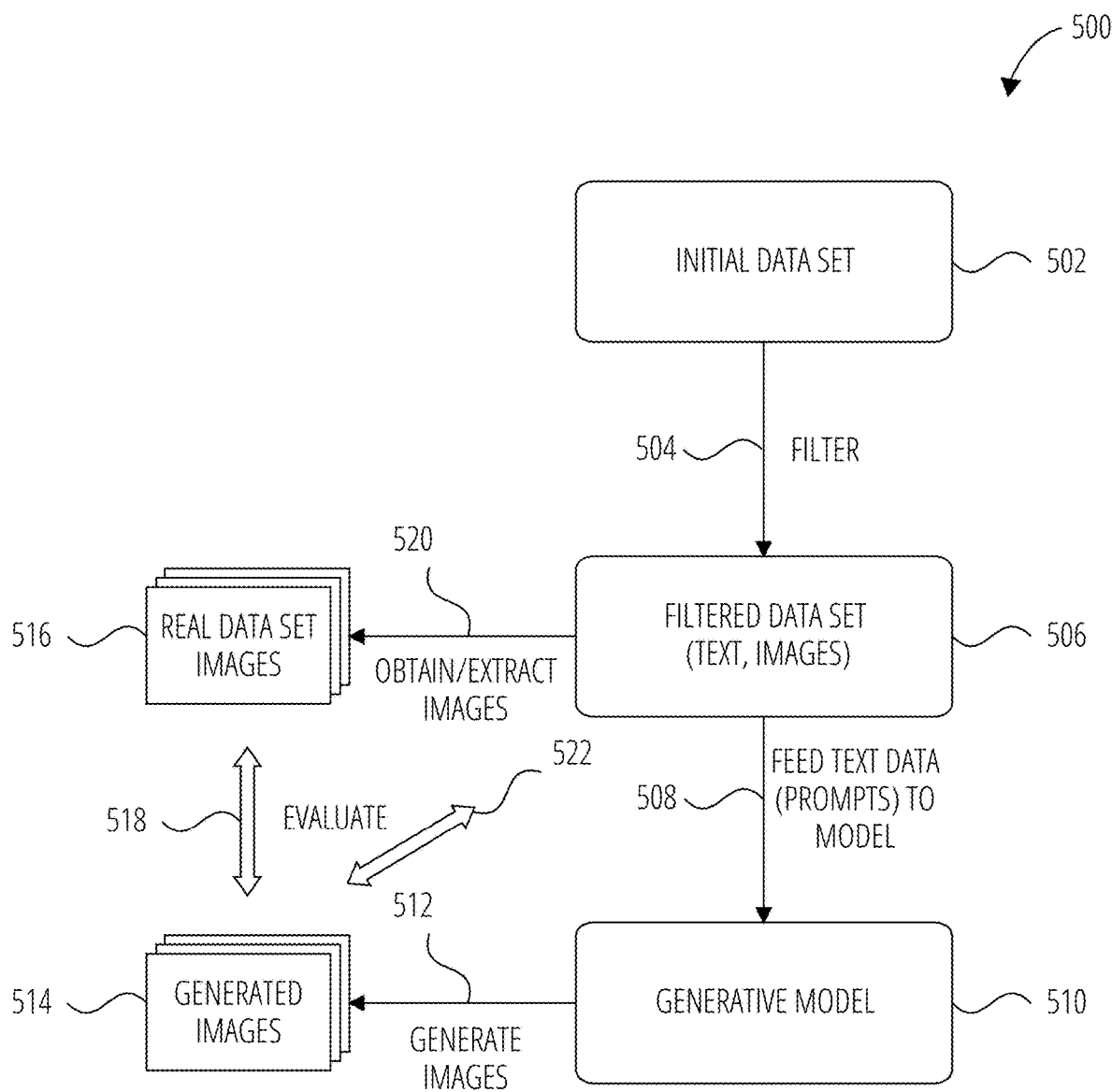
FIG. 5 is a diagrammatic representation of aspects of creation of an image quality evaluation framework and operation of an image quality evaluation system, according to some examples.

FIG. 5 is a diagrammatic representation of a process 500, illustrating aspects of creation of an image quality evaluation framework and operation of the image quality evaluation system 236, according to some examples.

A pipeline process may commence with query (prompt) filtration. A relatively large initial data set 502 is filtered to ensure that meaningful and relevant prompts are used for image quality evaluation. For example, a data set including over ten million prompts collected from an AI image generation service can be used as a starting point. These prompts can be filtered to obtain, for example, 5,000, 10,000, or 20,000 prompts that provide a meaningful and diverse set of queries for a particular application. Examples of use cases include the generation of background images for a user profile on a social networking platform, the generation of images to be inserted into a lifestyle blog, or the generation of landscape images in an artistic style. Filtering can be carried out, for example, by analyzing prompts that are typically used in the relevant use case and then extracting image-text pairs with text or metadata similar to those prompts.

As shown in FIG. 5, the initial data set 502 may thus be filtered (see the arrow 504) to obtain a filtered data set 506. The filtering process may include cleaning the data set, e.g., by removing duplicates, stop words, words in languages that are not relevant, or records with empty fields. After cleaning, text may be encoded (e.g., into a 768-dimensional vector using a suitable text encoder). Encoded text may be analyzed to ensure that a sufficiently diverse set of prompts is selected in the final filtered data set 506. As a simplified example, it may be desirable not only to have queries (prompts) relating to one domain, such as queries about generating images of cars, but a diverse set of queries covering different types of vehicles, cities, landscapes, humans, animals, and many more, to reduce bias in the model.

The final filtered data set 506 may include the selected prompts and, in some examples, corresponding images. For example, where prompts are obtained (see the arrow 520 in FIG. 5) from a publicly accessible source such as an automated image generation service, the prompts may be stored within the interaction system 100 together with their corresponding images (the images originally generated by the automated image generation service). These can be referred to as the real data set images 516, as shown in FIG. 5. However, in some examples, the corresponding images may be generated by the automated image generation system 234, in which case they may be referred to as baseline images, as described in more detail below.

It may be advantageous to utilize the prompts from the same filtered data set 506, e.g., the same set of 10,000 prompts, for multiple image evaluations performed by the automated image generation system 234. For example, using the same prompts to generate and compare output from two different generative models, or four different generative models, may provide more accurate, justifiable, or meaningful results given that the visual output generated by each model is based on a uniform set of text inputs.

The prompts included in the filtered data set 506 are fed (see the arrow 508 in FIG. 5) to a generative model 510 to allow the generative model 510 to generate one or more images (see the arrow 512) based on each prompt. In this way, the image quality evaluation system 236 can obtain a set of generated images 514 that can be automatically analyzed across one or more image quality metrics. As shown by the arrows 518 in FIG. 5, this may include evaluating the generated images 514 against the real data set images 516 (or against the images generated by a different model, referred to as baseline images), or evaluating the generated images 514 against the original prompts (illustrated by the arrows 522), e.g., to calculate alignment scores.

In some examples, a set of images used as a starting point for comparisons with a set of images generated by a model, e.g., a newly trained model. For example, the real data set images 516 may be compared with the generated images 514. Alternatively or additionally, a set of baseline images generated by another model may be compared with the generated images 514. A comparison may include generating one or more Fréchet Inception Distance (FID) scores. FID is a metric that can be used to evaluate the quality and diversity of images. It involves measuring the similarity between the distribution of one set of images (e.g., generated by a new model) and the distribution of another set of images (e.g., a baseline). If the FID score of the newly generated images is significantly higher than the FID score of the real images, it may suggest that the generated images are of lower quality or are not similar to the real data set images 516 or the baseline. The new model or training process may need to be adjusted appropriately. On the other hand, if the FID score of the newly generated images is close to or lower than the FID score of the real data set images 516 or baseline, it may suggest that the generated images are of good quality or are similar to the real images. From this, it may be understood that the new model is generating images in substantially the desired distribution.

In some examples, the image quality evaluation system 236 is configured to evaluate image quality based on one or more of: aesthetic quality, alignment, and visual realism. The examples described below with reference to FIG. 5, FIG. 6A, FIG. 6B and FIG. 9 discuss evaluation of quality based on these three metrics. It should, however, be appreciated that other examples may be implemented by utilizing only one or two of these metrics, or utilizing one or more other metrics (in addition to or as alternatives to the aforementioned metrics).

A first quality metric assessed by the image quality evaluation system 236 may be aesthetic quality and the image quality evaluation system 236 may generate a first quality indicator in the form of an aesthetic quality score for an AI-generated image.

In some examples, the aesthetic quality score for each image is generated by a Multi-Layer Perceptron (MLP) neural network. The MLP neural network may be trained (e.g., using a data set of images along with their aesthetic quality scores in a supervised learning process) to analyze an image and to predict an aesthetic quality score for the image that is correlated with likely human perception of the image. In other words, the MLP neural network can be trained to predict whether a human would be likely to find an image to be "beautiful."

An image can be encoded into a vector by a feature extractor (this is referred to as feature extraction). The aim of the encoding process is to extract meaningful features from images and represent them in a lower-dimensional space. The MLP model may then, using a regressor, process the extracted features through several layers to generate an output, e.g., in the form of a score in the range of 0 to 10 (with 10 being the maximum aesthetic quality).

A second quality metric assessed by the image quality evaluation system 236 (different from the first quality metric) may be alignment, and the image quality evaluation system 236 may generate a second quality indicator in the form of an alignment score for an AI-generated image.

Both the image and the text prompt are encoded into respective vector representations. In some examples, an alignment model in the form of a neural network may be used to predict alignment scores, indicating a level of alignment between the image and the original prompt. The alignment model may apply an attention mechanism to align the encoded prompt and image features, and the aligned features are combined and fed through a decoder to predict an alignment score. In other examples, a technique such as cosine similarity may be employed. In the cosine similarity technique, the angle between the two vectors is computed to provide a measure of similarity (e.g., with a higher value indicating a higher degree of similarity).

A third quality metric assessed by the image quality evaluation system 236 (different from the first and second quality metrics) may be visual realism and the image quality evaluation system 236 may generate a third quality indicator in the form of a visual realism score for an AI-generated image.

In some examples, a Visual Question Answering (VQA) model may be implemented to generate a visual realism score (or components thereof). A VQA model is an AI tool that is trained to answer natural language questions about visual content, such as images or videos. VQA systems combine computer vision and natural language processing (NLP) techniques to understand the content of an image and answer questions about it.

In a VQA system, the input may be an image and a question in natural language, and the output may be a natural language answer to the question. The system typically consists of two main components: a computer vision model and an NLP model. The computer vision model extracts features from the image, while the NLP model processes the question and generates an answer. To train a VQA model, a relatively large data set of images and corresponding questions and answers is typically required. In some examples, the data set is used to train the computer vision and NLP models using supervised learning techniques.

As a non-limiting example, a VQA model may be trained as follows in the visual realism context. The VQA model may be trained using training images that contain artifacts (or other defects or abnormalities that reduce realism) and training images that do not contain artifacts, in order to learn how to answer questions about whether an image contains artifacts. The VQA model may then be tested by experimenting with a number of questions. The questions that prove to be the most useful in enabling the VQA model to differentiate between images of different visual quality levels can then be selected as a final set of questions. For example, a set of 10 questions may be selected from an original set of 250, and the set of 10 questions may then be applied in production. In some examples, the most "differentiable" questions are selected by analyzing factors such as precision, recall and F1 (accuracy) scores.

Based on the respective first quality indicators, second quality indicators and third quality indicators, a combined score may be generated for each image. Merely as a non-limiting example, an image's combined score may be automatically calculated by multiplying the aesthetic quality score with the alignment score and with an average visual realism score (or normalized versions thereof, as required). As another non-limiting example, the image's combined score may be automatically calculated by adding the alignment score to the aesthetic quality score, and reducing the score by applying a penalty based on lack of visual realism (e.g., if an image contains many artifacts, a greater penalty is applied than if the image contains only a few artifacts). However, it will be appreciated that these scores may be expressed in various ways, and the exact manner in which a combined score is determined depends on the specific implementation.

Generally, in order to train a model to provide one or more functionality as described in examples of the present disclosure, training data in the form of prompts, images, and metadata may be used. A training data set may include thousands or millions of AI-generated images paired with the prompts that produced them. The training data set may also include scores associated with training pairs (image-text pairs). For example, a given training pair may include a text prompt and a corresponding AI-generated image, as well as an aesthetic quality score for the image and an alignment score indicative of alignment between the text and the generated image.

In some examples, the training data set may also include, for each image, a caption generated by an automated caption generator, such as an image-to-text model. These captions may be used to provide an indication of reverse alignment and can be used in the training process to train a model to predict reverse alignment scores. A caption can, for example, be automatically generated for an image using a multimodal encoder-decoder.

A multimodal encoder-decoder may be based on a BLIP (Bootstrapping Language-Image Processing) model architecture which comprises the following functional components: a unimodal encoder, an image-grounded text encoder, and an image-grounded text decoder. The multimodal encoder-decoder module provides a unified model for vision-language understanding and generation. The multimodal encoder-decoder module can operate in one of three functionalities using its different functional components (the unimodal encoder, the image-grounded text encoder, or the image-grounded text decoder).

One or more of the functionalities of a multimodal encoder-decoder module may be used to implement methodologies described herein, such as image encoding, text encoding, and caption generation. However, the multimodal encoder-decoder architecture described above is merely an example, and other types of encoders, decoders, text generators, caption predictors, and the like, whether separated or incorporated into a single system, may be used in some examples.

As used in this disclosure, the term "machine learning model" (or simply "model") may refer to a single, stand-alone model, or a combination of models. For example, the term "VQA" model may refer to a machine learning system that includes both a computer vision model and an NLP model. The term may also refer to a system or module that includes a machine learning model together with one or more supporting or supplementary components that do not necessarily perform machine learning tasks.

Figure 6A:
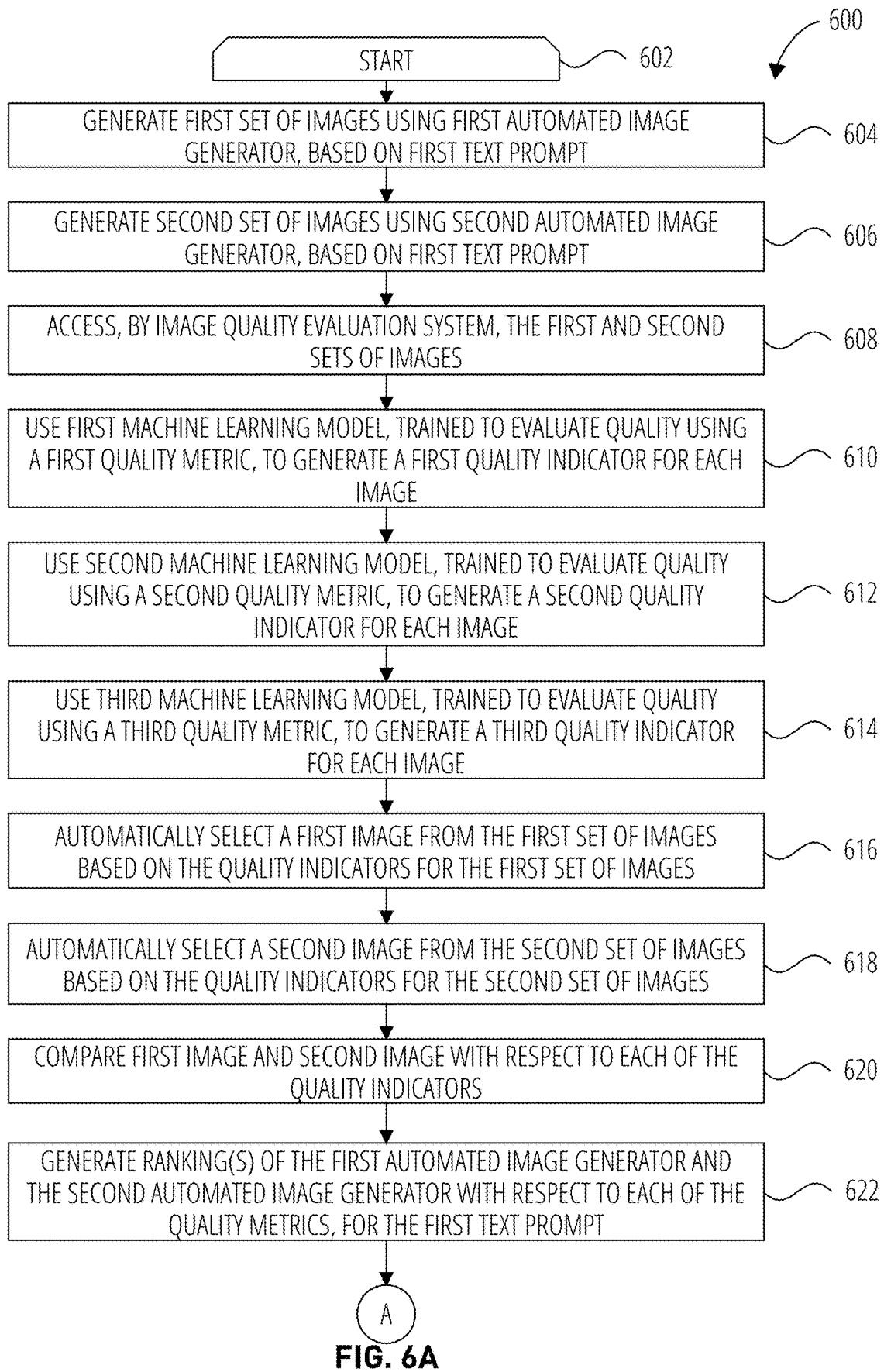
FIG. 6A is a flow diagram illustrating a method of automatic image quality evaluation, according to some examples.

FIG. 6A is a flow diagram illustrating a method 600 of automatic image quality evaluation, according to some examples. The method 600 may be performed by components of the interaction system 100, including the automated image generation system 234 and the image quality evaluation system 236.

Figure 7:
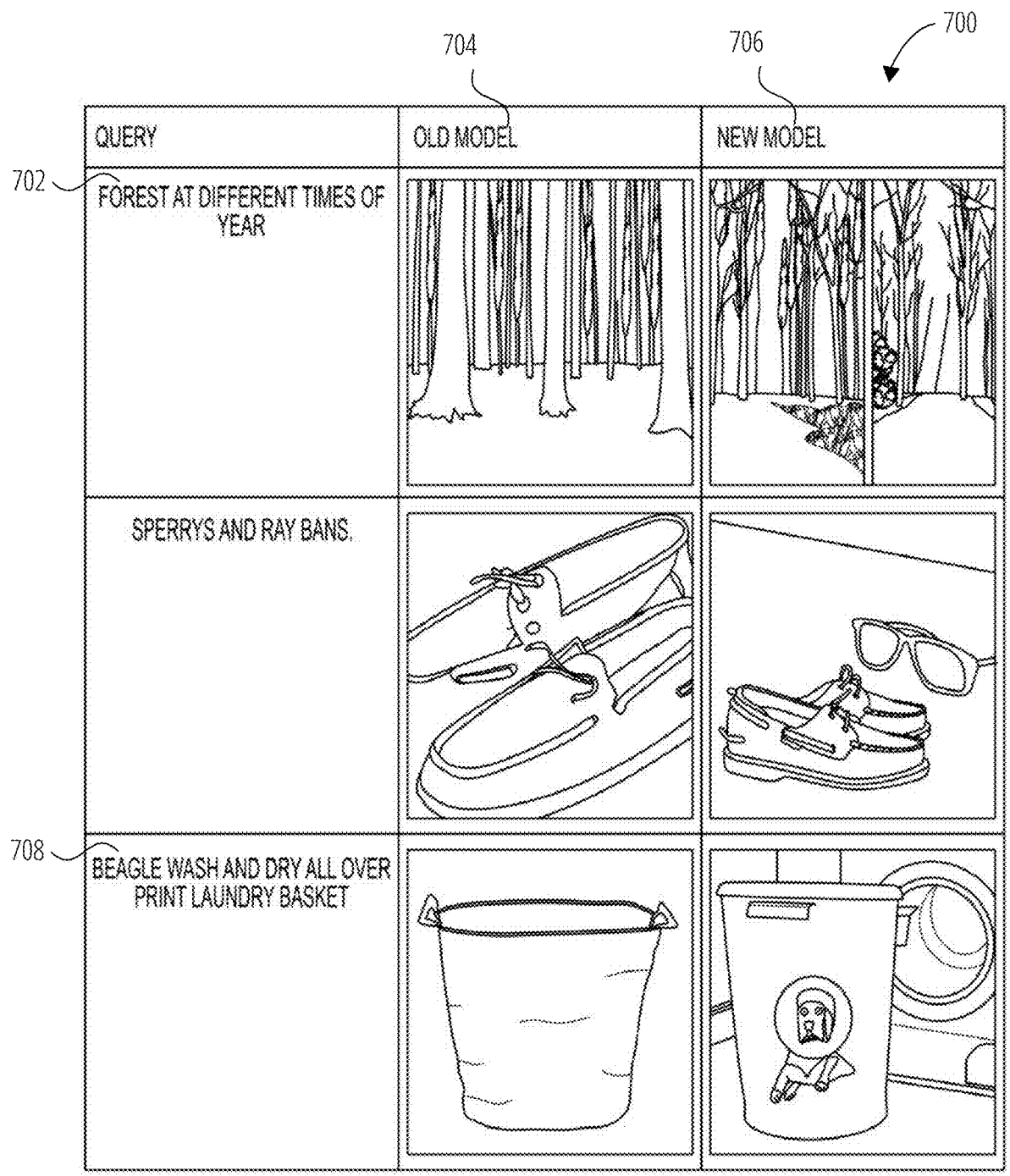
FIG. 7 is a table illustrating examples that represent images generated by two different models based on queries (prompts), according to some examples.

The method 600 commences at opening loop block 602 and proceeds to block 604, where a first set of images is generated by a first automated image generator, based on a first text prompt. For example, the first automated image generator may generate four images, each based on the first text prompt. The first automated image generator may be a first text-to-image machine learning model, e.g., a diffusion model. Merely as an example, and as shown in FIG. 7, the first text prompt may read: "Forest at different times of year." The model may output four variations/versions of an image based on this prompt.

A text prompt may include any character or sequence of characters, e.g., letters, numbers, punctuation, and other symbols. A text prompt may be in the form of a single character, a word, or a longer string of text.

At block 606, a second set of images is generated by a second automated image generator, also based on the first text prompt. The second automated image generator may also be a text-to-image machine learning model that generates four images based on the first text prompt (it will be appreciated that four images are merely an example, and that any suitable number of images may be generated by each model).

Given that many generative AI tools are probabilistic in nature, they may not produce an exact output for a given input, but rather generate a distribution of possible outputs. In the case of automated image generation, a model may generate multiple images that are all plausible interpretations of the given prompt (as determined by the mode), e.g., four images with some variation in colors, textures, lighting, or other visual elements.

Accordingly, in some examples, prior to accessing of a set of images by the image quality evaluation system 236, the automated image generation system 234 may be used to generate the required images. In other examples, the image quality evaluation system 236 may access the images from an external component or service.

Referring specifically to the first automated image generator and the second automated image generator, as the two models implemented by these generators are different, e.g., in terms of their architecture, parameters or training, the images they generate are different, and it may be desirable to assess the four images generated by each model to evaluate and compare the models. For example, it may be desirable to compare the performance of a diffusion model with the performance of a GAN model, or to compare the performance of two diffusion models with different sets of predefined parameters.

To this end, at block 608, the image quality evaluation system 236 accesses the first and second sets of images. A first machine learning model, trained to evaluate quality based on a first quality metric, is applied by the image quality evaluation system 236 to generate a first quality indicator for each of the images in the first set of images and each of the images in the second set of images (block 610).

In the method 600, the first quality metric is aesthetic quality, and the first machine learning model thus outputs, for each image, an aesthetic quality score (predicting its aesthetic quality if it were to be judged by a human). The first machine learning model may apply one or more machine learning-based tasks and one or more other tasks, such as automatic rules-based calculations, to generate the output.

A second machine learning model, trained to evaluate quality based on a second quality metric, is applied by the image quality evaluation system 236 to generate a second quality indicator for each of the images in the first set of images and each of the images in the second set of images (block 612). In the method 600, the second quality metric is alignment, and the second machine learning model thus outputs, for each image, an alignment score (indicative of the alignment between the image and the first text prompt). The second machine learning model may apply one or more machine learning-based tasks and one or more other tasks, such as automatic rules-based calculations (e.g., a cosine similarity method), to generate the output.

A third machine learning model, trained to evaluate quality based on a third quality metric, is applied by the image quality evaluation system 236 to generate a third quality indicator for each of the images in the first set of images and each of the images in the second set of images (block 614). In the method 600, the third quality metric is visual realism, and the third machine learning model thus outputs, for each image, a visual realism score.

The third machine learning model may apply one or more machine learning-based tasks and one or more other tasks, such as automatic rules-based calculations, to generate the output. For example, the third machine learning model may employ a VQA system to obtain predictions as to whether an image contains artifacts or anomalies, or whether objects in the image appear distorted or otherwise unrealistic (e.g., a dog with multiple heads).

A visual realism evaluation may include two different measurements:

Does the image contain artifacts (binary)?
Visual realism average score (between 0 and 1)

The VQA system may, for example, be used to process a predefined set of questions (e.g., 10 questions) for each image. Each question may be given a weight of 1/N, where N is the number of questions. The VQA system may then allocate a score of 1/N to a total if a question is answered with a predefined answer (e.g., a predefined yes or no answer). For example, in the event that 10 questions are used and 7 answers match the respective predefined answer, the visual realism average score may be 0.7. In some examples, the visual realism scoring process involves making a determination (binary), using the VQA system, as to whether an image includes artifacts. A decision on whether the image has artifacts or not may be made based on comparing the visual realism average score to a threshold. The binary determination of whether the image contains artifacts may, for example, be linked to a threshold of 0.6. Thus, if the visual realism average score is calculated as being at or above 0.6, it would automatically be determined/predicted that the image does not contain artifacts (or contains an acceptable level/number of artifacts), while if the visual realism average score is calculated as being below 0.6, it would automatically be determined/predicted that the image does contain artifacts (or contains an unacceptable level/number of artifacts). In this way, a binary score of 0 or 1 may be associated with the visual realism average score. For example, a score of 0 may be "no artifacts" and a score of 1 may mean "yes, there are artifacts."

Depending on the implementation, the binary score, or the visual realism average score, may be used as the final visual realism score used to calculate a combined score for each image (described further below). Where only the visual realism average score is used, for example, the combined score can be calculated by multiplying aesthetic score, alignment score and visual realism average score. In other examples, both the binary score and the visual realism average score may be applied in downstream calculations (the binary score may, for instance, be applied as a penalty by reducing an overall score of a "yes, there are artifacts" determination is made).

At block 616, once the aesthetic, alignment, and visual realism scores have been determined for all the images in question, a first image from the first set of images is automatically selected. As mentioned above, the image quality evaluation system 236 may automatically generate a combined score that takes the aesthetic, alignment and visual realism scores for each image into account, and the image with a highest combined score may be selected. Similarly, at block 618, a second image is selected from the second set of images, e.g., based on it having the highest combined score of the four images in the second set of images.

At block 620, the first image (the image selected from the first set of images generated by the first automated image generator) and the second image (the image selected from the second set of images generated by the second automated image generator) are automatically compared by the image quality evaluation system 236. Comparisons and rankings (as described below) may be automatically carried out, e.g., by one or more machine learning models or by other computing components.

In some examples, the image quality evaluation system 236 separately compares the aesthetic quality scores, alignment scores, and visual realism scores of these two images. In this way, the two automated image generators may be compared or ranked across different dimensions, e.g., ranking data may be generated that indicates which model performs better in terms of aesthetic quality, and which model performs better in terms of visual realism (see block 622). In some examples, the two automated image generators may also be compared based on the combined scores of the first image and the second image to provide insights into the "overall" or "holistic" performance of each model.

In some examples, when comparing the best-performing image of each model (e.g., the first image and the second image referred to above), instead of using a two-sided evaluation for each quality metric ("better or worse"), the images can be classified relative to each other using three classes, or buckets, such as:

Significantly better
Significantly worse
Approximately the same

For example, if the alignment score of the second image exceeds the alignment score of the first image by more than 5% (this is merely a non-limiting example of a threshold that may be utilized), the image quality evaluation system 236 may determine that the second automated image generator performs "significantly better" than the first automated image generator when it comes to alignment. Examples relating to alignment scores are shown in the table 700 of FIG. 7, including examples for the first text prompt 702. In FIG. 7, the second automated image generator is referred to as the new model 706, and the first automated image generator is referred to as the old model 704. The new model 706 is shown to have performed significantly better than the old model 704 for three different prompts in terms of alignment, given that the generated images more closely match the words and context of the respective prompts.

The table 800 in FIG. 8 illustrates further examples, but relating to aesthetic quality scores. In the examples of FIG. 8, the new model 706 is shown to have performed significantly better than the old model 704 for three different prompts by achieving higher aesthetic scores. If the difference in scores is below a certain threshold, the models may be classified as "approximately the same," e.g., for a specific metric such as aesthetic quality score. The use of three categories, or classifications, may reduce noise in an automated image evaluation system.

Figure 6B:
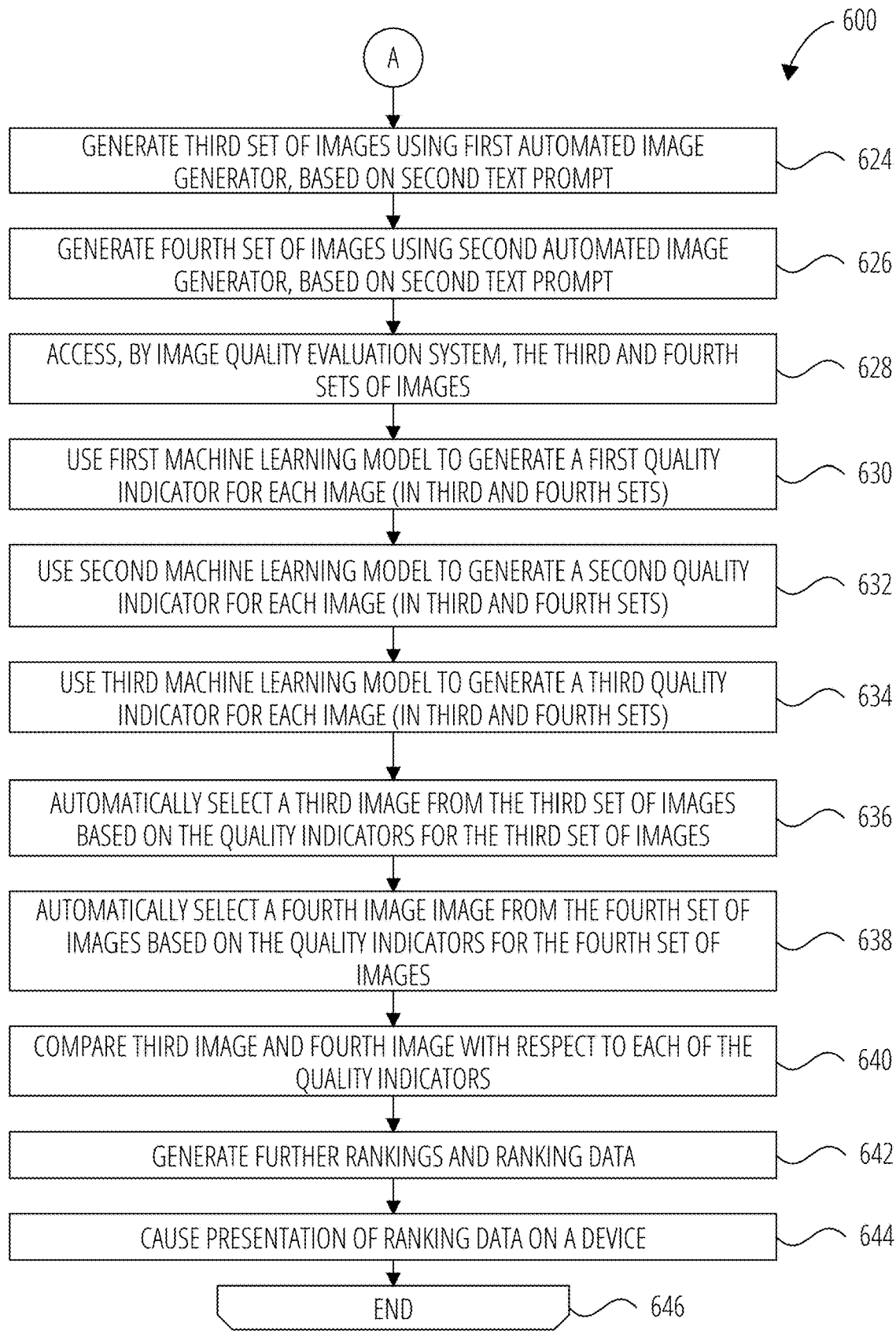
FIG. 6B is a flow diagram further illustrating the method of FIG. 6A, according to some examples.

FIG. 6B is a flow diagram further illustrating the method 600. FIG. 6B illustrates a process similar to that of FIG. 6A, but with respect to a second text prompt. As described with reference to FIG. 6A, the image quality evaluation system 236 may automatically compare a first set of images and a second set of images, respectively generated by a first and second generative AI model in response to a first text prompt. However, it may be desirable to evaluate further sets of images generated by these models, based on other prompts. In some examples, and referring back to FIG. 5, the first and second models may generate images based on each prompt in the filtered data set 506, and the evaluation may be automatically performed for all the images to generate comprehensive ranking data. In this way, more meaningful data concerning the performance, or relative performance, of generative models may be obtained. Accordingly, while the examples of FIG. 6A and FIG. 6B only describe a first prompt and a second prompt, it will be appreciated that the relevant steps may be repeated for a large number of prompts.

Turning now specifically to FIG. 6B, at block 624, the first automated image generator (e.g., first generative model) generates a third set of images based on a second text prompt. Merely as an example, and as indicated by reference numeral 708 in FIG. 7, the second text prompt may read: "beagle wash and dry all over print laundry basket." The model may output four variations/versions of an image based on this prompt. Again, and as mentioned above, the use of four images per set is merely an example, and other numbers may be employed.

At block 626, the second automated image generator (e.g., second generative model) generates a fourth set of images, also based on the second text prompt. Accordingly, each automated image generator automatically generates a further set of images, based on the second prompt, and the image quality evaluation system 236 accesses these images (block 628) in order to carry out automatic quality evaluation.

Referring to blocks 630, 632, and 634 in FIG. 6B, the image quality evaluation system 236 generates the aesthetic, alignment, and visual realism scores for each of the images in the third set of images and the fourth set of images, substantially as described with reference to FIG. 6A for the first set of images and the second set of images.

At block 636, once the aesthetic, alignment and visual realism scores have been determined for all the images in the third and fourth sets, a third image from the third set of images is automatically selected. Similarly, at block 638, a fourth image is selected from the fourth set of images. As mentioned above, the image quality evaluation system 236 may automatically generate a combined score that takes the aesthetic, alignment and visual realism scores into account for each image, and the image with a highest combined score may be selected from the particular set.

The method 600 proceeds to block 640, where the image quality evaluation system 236 automatically compares the third image and fourth image, e.g., as described with reference to FIG. 6A with respect to the comparison of the first image and the fourth image. Based on the automatic comparison between the third image and the fourth image (e.g., a comparison of the third image relative to the fourth image in terms of one or more individual metrics, or using combined scores), further ranking data may be generated (block 642) to reflect the performance of the first automated image generator and the second automated image generator with respect to the second text prompt. Ranking data presented to a user on a user device (block 644) may thus be generated using multiple individual rankings, e.g., it may be generated using the rankings associated with each prompt used to generate the images in the automatic quality evaluation process. Ranking data may be processed or filtered as required, e.g., to provide, within a user interface, summary statistics with respect to the quality of images generated by each generative model in question.

In some examples, a user may be presented with a set of summary statistics indicating one or more of the following data:
  The models that were compared/ranked in the evaluation process
  The number of prompts used to generate images (e.g., 5,000 prompts, 10,000 prompts, or 50,000 prompts)
  The number of images generated (overall or per prompt, e.g., 4 images per prompt for each model)
  Evaluation methodology utilized (e.g., automatically selecting the best image per prompt for each model, comparing the best images per prompt to evaluate model performance, and generating ranking/comparison data reflecting the results)
  Manner in which the best image is selected (e.g., highest score)
  Comparison/ranking of the models in terms of overall image quality scores
  Comparison/ranking of the models in terms of aesthetic quality scores
  Comparison/ranking of the models in terms of alignment scores
  Comparison/ranking of the models in terms of visual realism scores
  Selected images to illustrate differences in quality This may provide a user with convenient and useful insights into model performance, whether holistically (e.g., overall performance based on combined scores) or at a more granular level (e.g., how do the models compare in terms of the visual realism of their images?). The method 600 concludes at closing loop block 646.

The examples in FIGS. 6A, 6B, 7, and 8 describe the manner in which an automatic quality evaluation system may be used to facilitate ranking or comparison of different generators (e.g., generative models). This may, for instance, be of use if a user wishes to understand a model's performance relative to the performance of another model (or models). However, examples of the present disclosure provide an automatic quality evaluation system that can be applied to images generated by a single generator, e.g., to compare images generated by the same generative model in order to select one or more images that are preferred in a particular situation (or simply to gain a better understanding as differences in quality between images generated by the same model).

Figure 9:
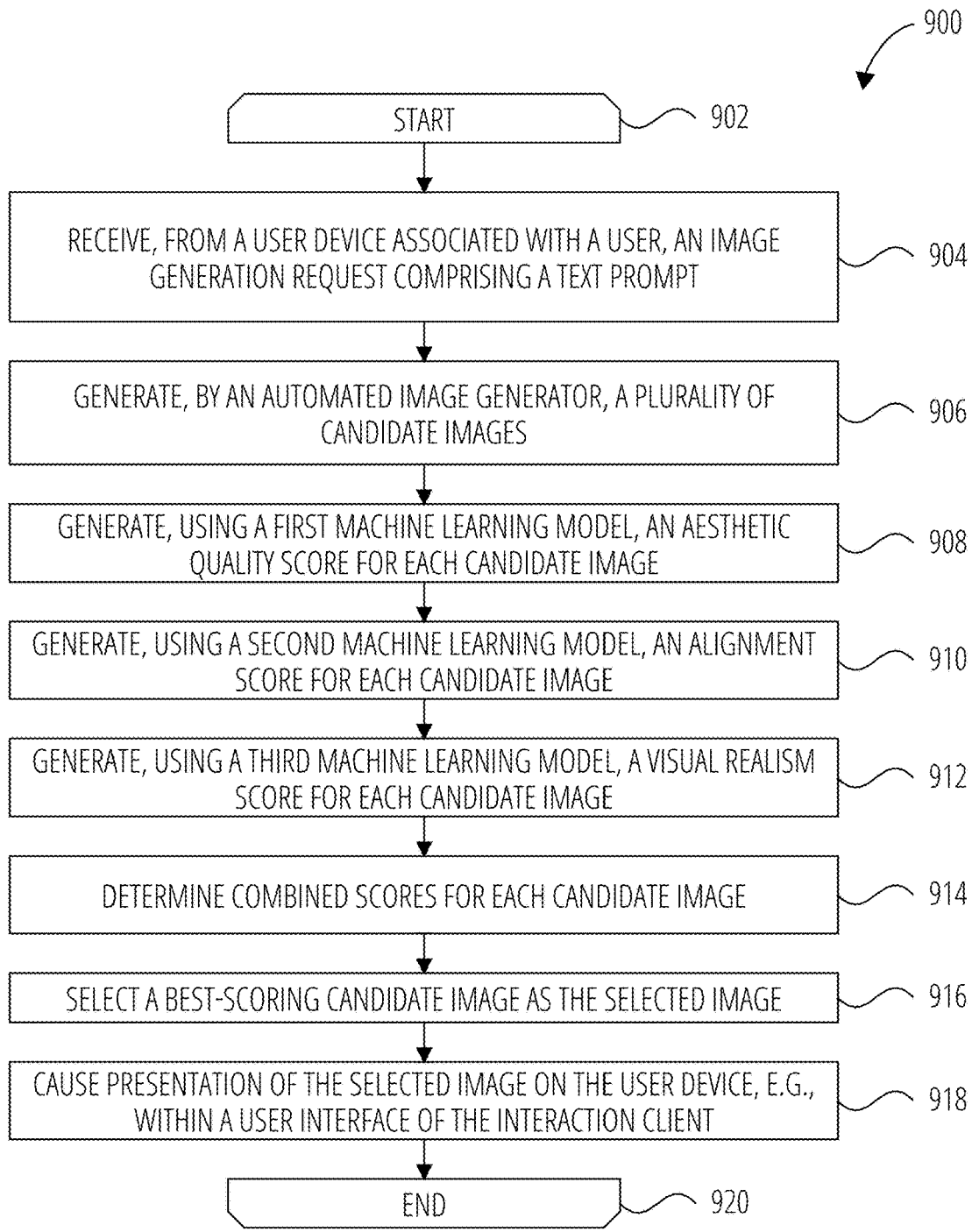
FIG. 9 is a flow diagram illustrating a method of automatic image quality evaluation and presentation of a selected image on a user device, according to some examples.

FIG. 9 is a flow diagram illustrating a method 900 of automatic image quality evaluation and presentation of a selected image on a user device, according to some examples. The method 900 may be performed by components of the interaction system 100, including the automated image generation system 234 and the image quality evaluation system 236.

The method 900 commences at opening loop block 902 and proceeds to block 904, where an image generation request is received from a user device associated with a user. The automated image generation system 234 may receive an image generation request submitted, for example, by a user using the mobile device 114 typing a prompt into an input text box provided by a user interface of the interaction client 104. In some examples, the interaction client 104 may provide a generative AI feature allowing the user to enter or select a prompt and then receive, in response, an automatically generated image (or video).

In response to receiving the image generation request, at block 906, the automated image generation system 234 generates a plurality of candidate images. For example, a diffusion model of the automated image generation system 234 may generate five images, all based on the same prompt. In order to select one of the images to present to the user on the user device based on image quality, these candidate images are scored as described below.

As mentioned above, aesthetic quality, alignment, and visual realism may be components of a quality assessment, e.g., these metrics may be used to assess different aspects of image quality. At block 908, a first machine learning model generates an aesthetic quality score for each candidate image. For example, this may be in the form of a predicted aesthetic quality for each image, on a scale of 0 to 10.

At block 910, a second machine learning model generates an alignment score for each candidate image. For example, this may be generated by the second machine learning model by encoding an image and the prompt and measuring cosine similarity.

At block 912, a third machine learning model generates a visual realism score for each candidate image. For example, this may be a visual realism average score generated by a VQA model, as described above.

A combined score is determined for each candidate image at block 914. The best (e.g., highest) scoring candidate image is then identified as a selected image (block 916), and the interaction system 100 causes presentation of the selected image on the user device at block 918. For example, the selected image may be presented within a suitable user interface of the interaction client 104.

Table 1 below illustrates the determination of a combined score for an image, according to some examples, where the combined score is calculated by multiplying an aesthetic quality score with an alignment score, and with an average visual realism score. For purposes of this non-limiting determination, aesthetic quality score can range between 0 and 10 (with 10 being the highest aesthetic quality score), alignment score can range between −1 and 1 (with 1 being the highest alignment score), and visual realism score (average) can range between 0 and 1 (with 1 being the highest average visual realism score).

TABLE 1

Example of a combined score calculation

| Metric | Score |
| --- | --- |
| Aesthetic quality score | 5.58 |
| Alignment score | 0.33 |
| Visual realism score (average) | 0.32 |
| Combined (final) score | 0.59 |

The candidate images not selected by the image quality evaluation system 236 may be deleted from the interaction system 100. It should be appreciated that, in other examples, a selected image may be identified on a different basis, e.g., using only a subset of the quality metrics instead of the aforementioned combination. The method concludes at closing loop block 920.

In some examples, a highest-scoring candidate image may be identified as the "best" or "selected" image. However, it will be appreciated that selection may depend on the scoring methodology. For example, in some cases, a scoring system may be designed such that a lowest-scoring image is the "best" performing image in a particular scenario.

The user may utilize the selected or presented image for various purposes, e.g., apply the generated image to a user profile or chat profile, in which case the image may be stored as part of the profile data 302. The user may also download and store the image in a media library or external storage component. In other examples, the user may include the image in a message sent to the user system 102 of another user of the interaction system 100, in which case the image can be stored as part of message data in the message table 306. The image may be used in an augmentation process, e.g., used to augment image data or included in a content item that also includes an augmentation, such as an image filter applied thereto. The method 900 concludes at closing loop block 920.

Machine Learning Program

Figure 10:
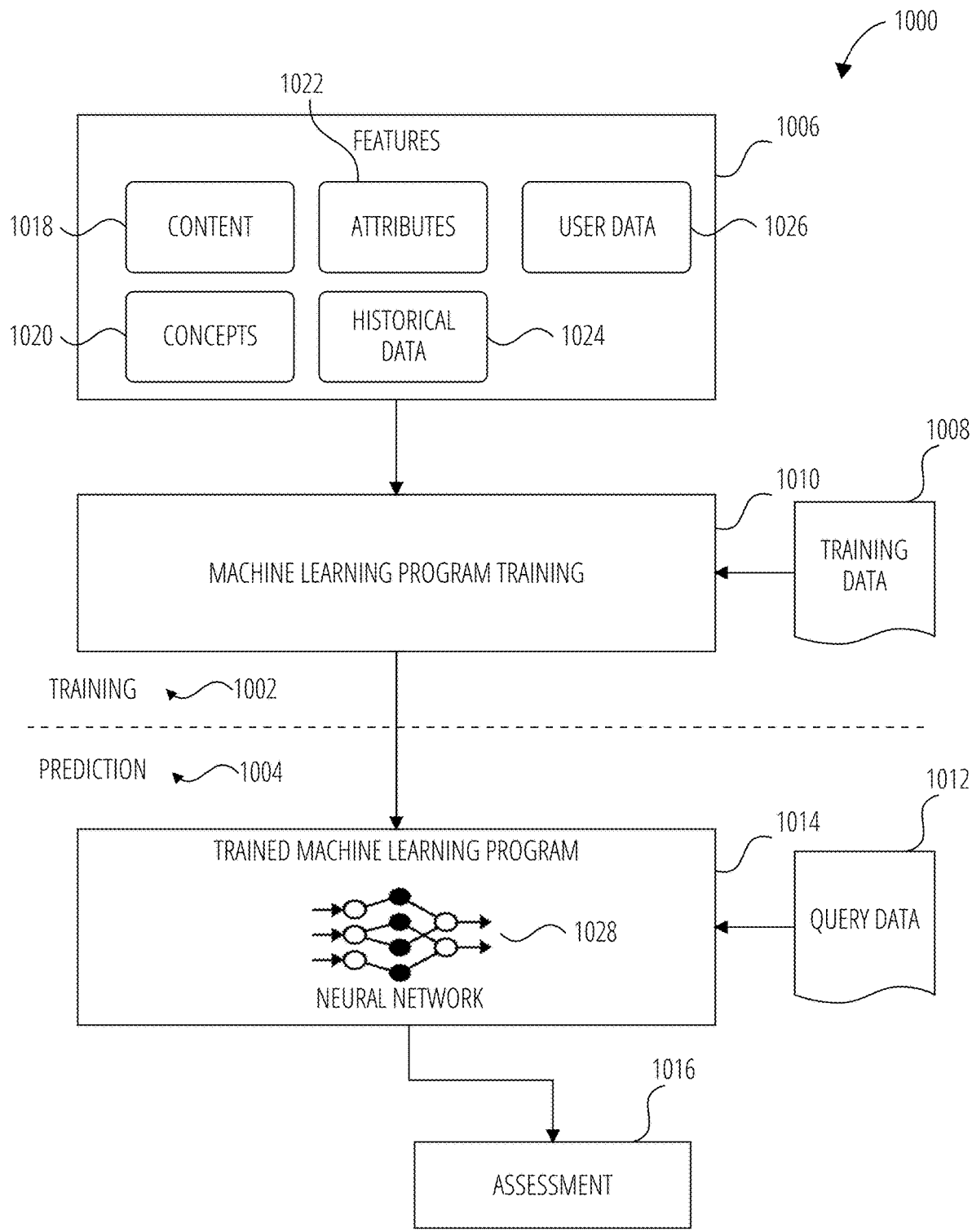
FIG. 10 is a diagrammatic illustration of training and use of a machine learning program, according to some examples.

FIG. 10 is a block diagram showing a machine learning program 1000, according to some examples. The machine learning programs 1000, also referred to as machine learning algorithms or tools, are used as part of the systems described herein to perform operations associated with searches and query responses.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 1008 in order to make data-driven predictions or decisions expressed as outputs or assessments (e.g., assessment 1016). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 1000 supports two types of phases, namely training phases 1002 and prediction phases 1004. In training phases 1002, supervised learning, unsupervised or reinforcement learning may be used. For example, the machine learning program 1000 (1) receives features 1006 (e.g., as structured or labeled data in supervised learning) and/or (2) identifies features 1006 (e.g., unstructured or unlabeled data for unsupervised learning) in training data 1008. In prediction phases 1004, the machine learning program 1000 uses the features 1006 for analyzing query data 1012 to generate outcomes or predictions, as examples of an assessment 1016.

In the training phase 1002, feature engineering is used to identify features 1006 and may include identifying informative, discriminating, and independent features for the effective operation of the machine learning program 1000 in pattern recognition, classification, and regression. In some examples, the training data 1008 includes labeled data, which is known data for pre-identified features 1006 and one or more outcomes. Each of the features 1006 may be a variable or attribute, such as individual measurable property of a process, article, system, or phenomenon represented by a data set (e.g., the training data 1008). Features 1006 may also be of different types, such as numeric features, strings, and graphs, and may include one or more of content 1018, concepts 1020, attributes 1022, historical data 1024 and/or user data 1026, merely for example.

The concept of a feature in this context is related to that of an explanatory variable used in statistical techniques such as linear regression. Choosing informative, discriminating, and independent features is important for the effective operation of the machine learning program 1000 in pattern recognition, classification, and regression. Features may be of different types, such as numeric features, strings, and graphs.

In training phases 1002, the machine learning program 1000 uses the training data 1008 to find correlations among the features 1006 that affect a predicted outcome or assessment 1016.

With the training data 1008 and the identified features 1006, the machine learning program 1000 is trained during the training phase 1002 at machine learning program training 1010. The machine learning program 1000 appraises values of the features 1006 as they correlate to the training data 1008. The result of the training is the trained machine learning program 1014 (e.g., a trained or learned model).

Further, the training phases 1002 may involve machine learning, in which the training data 1008 is structured (e.g., labeled during preprocessing operations), and the trained machine learning program 1014 implements a relatively simple neural network 1028 capable of performing, for example, classification and clustering operations. In other examples, the training phase 1002 may involve deep learning, in which the training data 1008 is unstructured, and the trained machine learning program 1014 implements a deep neural network 1028 that is able to perform both feature extraction and classification/clustering operations.

A neural network 1028 generated during the training phase 1002, and implemented within the trained machine learning program 1014, may include a hierarchical (e.g., layered) organization of neurons. For example, neurons (or nodes) may be arranged hierarchically into a number of layers, including an input layer, an output layer, and multiple hidden layers. Each of the layers within the neural network 1028 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which define the influence of the input from a transmitting neuron to a receiving neuron.

In some examples, the neural network 1028 may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), a Recursive Neural Network (RNN), a VAE, a GAN, or an autoregressive model, merely for example.

During prediction phases 1004, the trained machine learning program 1014 is used to perform an assessment. Query data 1012 is provided as an input to the trained machine learning program 1014, and the trained machine learning program 1014 generates the assessment 1016 as output, responsive to receipt of the query data 1012.

In some examples, a trained machine learning program 1014 can be used for automated image generation as described in the present disclosure. Automated image generation, and specifically text-guided AI-driven image generation, can be achieved using different types of machine learning programs (or models), including various types of neural networks and other model types. Examples of these include Variational Autoencoders (VAEs), GANS, autoregressive models, and diffusion models.

A VAE is an unsupervised machine learning program that generates an image by processing a text prompt and mapping it to a latent space representation. The latest space representation may then be used to generate an image that corresponds to the text prompt. VAEs are designed to learn the distribution of a dataset and apply that to generate new images likely to conform more closely to the dataset.

A GAN is a generative model that comprises a generator and a discriminator. The generator may generate images based on text prompts, and the discriminator may evaluate the generated images for realism and/or other metrics, depending on the implementation. The generator and discriminator are trained simultaneously to generate images aimed at closely matching the input text prompt. The generator generates an image that is intended to deceive the discriminator into designating the image as "real," while the discriminator generates an image to evaluate the realism of the generator's output. In this way, both networks can be optimized toward their objectives and improve the quality of the generated images.

Autoregressive models generate images pixel by pixel, where each pixel is generated based on the previous pixels. Autoregressive models may be trained, for example, using maximum likelihood estimation (MLE) to learn the conditional probability distribution of each pixel in an image given its previous pixels.

Diffusion models are generative models that generate images by diffusing noise over time. The program may take in a text prompt and generate a noise vector, which is then diffused over a set number of time steps to generate an image. It is based on the concept of "diffusing" noise throughout an image to transform it gradually into a new image. A diffusion model may use a sequence of invertible transformations to transform a random noise image into a final image. During training, a diffusion model may learn sequences of transformations that can best transform random noise images into desired output images. A diffusion model is fed with input data (e.g., a text prompt describing the desired image) and the corresponding output images, and the parameters of the model are adjusted iteratively to improve the model's ability to generate accurate images. Once trained, in order to generate an image, the model uses a text prompt as input and applies the trained sequence of transformations to generate an output image. The model generates the image in a step-by-step manner, with each step updating the image with additional information until the image is fully generated. This process may be repeated to produce a set of candidate images, from which the final image is chosen based on criteria such as a likelihood score. The resulting image is intended to represent a visual interpretation of the text prompt.

In some examples, a diffusion-based model may also take an image as an input to produce a generated image that is conditioned on the input image and the relevant text. In this way, an AI-generated image can be seeded with an initial image such as a drawing or photograph, with the model being instructed to build or generate a new image on top of, or conditioned on, the input image, e.g., to preserve a general shape or layout of the input image. While a text-to-image diffusion technique that does not utilize an input image may commence the diffusion process with pure noise and progressively refine the generated image, using an input image may allow for some earlier steps to be skipped, e.g., by commencing with the input image mixed with Gaussian noise.

Data Communications Architecture

Figure 11:
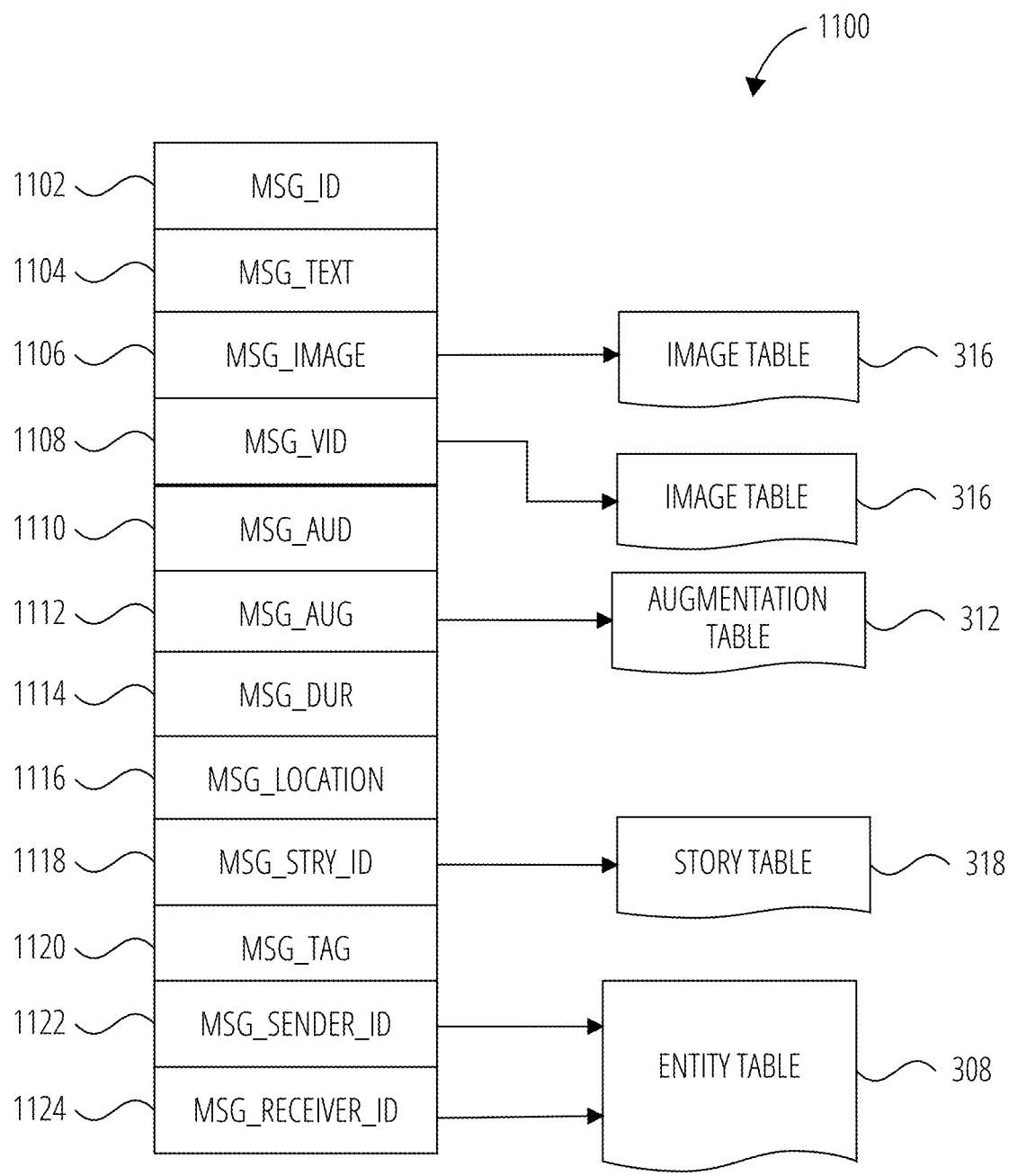
FIG. 11 is a diagrammatic representation of a message, according to some examples.

FIG. 11 is a schematic diagram illustrating a structure of a message 1100, according to some examples, generated by an interaction client 104 for communication to a further interaction client 104 via the interaction servers 124. The content of a particular message 1100 is used to populate the message table 306 stored within the database 304, accessible by the interaction servers 124. Similarly, the content of a message 1100 is stored in memory as "in-transit" or "in-flight" data of the user system 102 or the interaction servers 124. A message 1100 is shown to include the following example components:

Message identifier 1102: a unique identifier that identifies the message 1100.

Message text payload 1104: text, to be generated by a user via a user interface of the user system 102, and that is included in the message 1100.

Message image payload 1106: image data, captured by a camera component of a user system 102 or retrieved from a memory component of a user system 102, and that is included in the message 1100. Image data for a sent or received message 1100 may be stored in the image table 316.

Message video payload 1108: video data, captured by a camera component or retrieved from a memory component of the user system 102, and that is included in the message 1100. Video data for a sent or received message 1100 may be stored in the image table 316.

Message audio payload 1110: audio data, captured by a microphone or retrieved from a memory component of the user system 102, and that is included in the message 1100.

Message augmentation data 1112: augmentation data (e.g., filters, stickers, or other annotations or enhancements) that represents augmentations to be applied to message image payload 1106, message video payload 1108, or message audio payload 1110 of the message 1100. Augmentation data for a sent or received message 1100 may be stored in the augmentation table 312.

Message duration parameter 1114: parameter value indicating, in seconds, the amount of time for which content of the message (e.g., the message image payload 1106, message video payload 1108, message audio payload 1110) is to be presented or made accessible to a user via the interaction client 104.

Message geolocation parameter 1116: geolocation data (e.g., latitudinal and longitudinal coordinates) associated with the content payload of the message. Multiple message geolocation parameter 1116 values may be included in the payload, each of these parameter values being associated with respect to content items included in the content (e.g., a specific image within the message image payload 1106, or a specific video in the message video payload 1108).

Message story identifier 1118: identifier values identifying one or more content collections (e.g., "stories" identified in the story table 318) with which a particular content item in the message image payload 1106 of the message 1100 is associated. For example, multiple images within the message image payload 1106 may each be associated with multiple content collections using identifier values.

Message tag 1120: each message 1100 may be tagged with multiple tags, each of which is indicative of the subject matter of content included in the message payload. For example, where a particular image included in the message image payload 1106 depicts an animal (e.g., a lion), a tag value may be included within the message tag 1120 that is indicative of the relevant animal. Tag values may be generated manually, based on user input, or may be automatically generated using, for example, image recognition.

Message sender identifier 1122: an identifier (e.g., a messaging system identifier, email address, or device identifier) indicative of a user of the user system 102 on which the message 1100 was generated and from which the message 1100 was sent.

Message receiver identifier 1124: an identifier (e.g., a messaging system identifier, email address, or device identifier) indicative of a user of the user system 102 to which the message 1100 is addressed.

The contents (e.g., values) of the various components of message 1100 may be pointers to locations in tables within which content data values are stored. For example, an image value in the message image payload 1106 may be a pointer to (or address of) a location within an image table 316. Similarly, values within the message video payload 1108 may point to data stored within an image table 316, values stored within the message augmentation data 1112 may point to data stored in an augmentation table 312, values stored within the message story identifier 1118 may point to data stored in a story table 318, and values stored within the message sender identifier 1122 and the message receiver identifier 1124 may point to user records stored within an entity table 308.

System with Head-Wearable Apparatus

Figure 12:
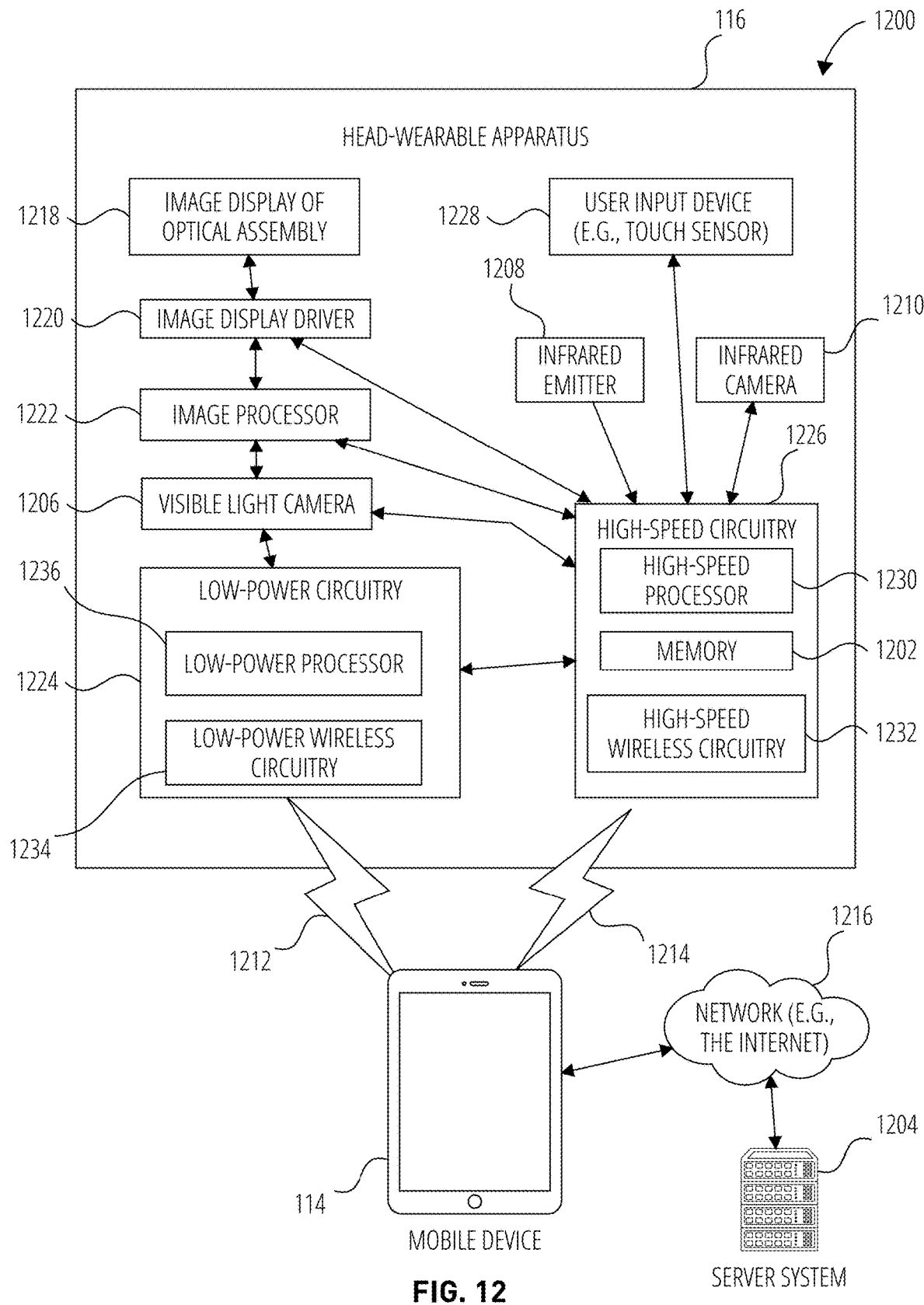
FIG. 12 is a diagrammatic representation of a system including a head-wearable apparatus, according to some examples.

FIG. 12 illustrates a system 1200 including a head-wearable apparatus 116 with a selector input device, according to some examples. FIG. 12 is a high-level functional block diagram of an example head-wearable apparatus 116 communicatively coupled to a mobile device 114 and various server systems 1204 (e.g., the interaction server system 110) via various networks 108.

The head-wearable apparatus 116 includes one or more cameras, each of which may be, for example, a visible light camera 1206, an infrared emitter 1208, and an infrared camera 1210.

The mobile device 114 connects with head-wearable apparatus 116 using both a low-power wireless connection 1212 and a high-speed wireless connection 1214. The mobile device 114 is also connected to the server system 1204 and the network 1216.

The head-wearable apparatus 116 further includes two image displays of the image display of optical assembly 1218. The two image displays of optical assembly 1218 include one associated with the left lateral side and one associated with the right lateral side of the head-wearable apparatus 116. The head-wearable apparatus 116 also includes an image display driver 1220, an image processor 1222, low-power circuitry 1224, and high-speed circuitry 1226. The image display of optical assembly 1218 is for presenting images and videos, including an image that can include a graphical user interface to a user of the head-wearable apparatus 116.

The image display driver 1220 commands and controls the image display of optical assembly 1218. The image display driver 1220 may deliver image data directly to the image display of optical assembly 1218 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1228 (e.g., touch sensor or push button), including an input surface on the head-wearable apparatus 116. The user input device 1228 (e.g., touch sensor or push button) is to receive from the user an input selection to manipulate the graphical user interface of the presented image.

The components shown in FIG. 12 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1206 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1202, which stores instructions to perform a subset or all of the functions described herein. The memory 1202 can also include a storage device.

As shown in FIG. 12, the high-speed circuitry 1226 includes a high-speed processor 1230, a memory 1202, and high-speed wireless circuitry 1232. In some examples, the image display driver 1220 is coupled to the high-speed circuitry 1226 and operated by the high-speed processor 1230 in order to drive the left and right image displays of the image display of optical assembly 1218. The high-speed processor 1230 may be any processor capable of managing high-speed communications and operation of any general computing system needed for the head-wearable apparatus 116. The high-speed processor 1230 includes processing resources needed for managing high-speed data transfers on a high-speed wireless connection 1214 to a wireless local area network (WLAN) using the high-speed wireless circuitry 1232. In certain examples, the high-speed processor 1230 executes an operating system such as a LINUX operating system or other such operating system of the head-wearable apparatus 116, and the operating system is stored in the memory 1202 for execution. In addition to any other responsibilities, the high-speed processor 1230 executing a software architecture for the head-wearable apparatus 116 is used to manage data transfers with high-speed wireless circuitry 1232. In certain examples, the high-speed wireless circuitry 1232 is configured to implement Institute of Electrical and Electronic Engineers (IEEE) 802.11 communication standards, also referred to herein as WiFi. In some examples, other high-speed communications standards may be implemented by the high-speed wireless circuitry 1232.

The low-power wireless circuitry 1234 and the high-speed wireless circuitry 1232 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 1212 and the high-speed wireless connection 1214, may be implemented using details of the architecture of the head-wearable apparatus 116, as can other elements of the network 1216.

The memory 1202 includes any storage device capable of storing various data and applications, including, among other things, camera data generated by the left and right visible light cameras 1206, the infrared camera 1210, and the image processor 1222, as well as images generated for display by the image display driver 1220 on the image displays of the image display of optical assembly 1218. While the memory 1202 is shown as integrated with high-speed circuitry 1226, in some examples, the memory 1202 may be an independent standalone element of the head-wearable apparatus 116. In certain such examples, electrical routing lines may provide a connection through a chip that includes the high-speed processor 1230 from the image processor 1222 or the low-power processor 1236 to the memory 1202. In some examples, the high-speed processor 1230 may manage addressing of the memory 1202 such that the low-power processor 1236 will boot the high-speed processor 1230 any time that a read or write operation involving memory 1202 is needed.

As shown in FIG. 12, the low-power processor 1236 or high-speed processor 1230 of the head-wearable apparatus 116 can be coupled to the camera (visible light camera 1206, infrared emitter 1208, or infrared camera 1210), the image display driver 1220, the user input device 1228 (e.g., touch sensor or push button), and the memory 1202.

The head-wearable apparatus 116 is connected to a host computer. For example, the head-wearable apparatus 116 is paired with the mobile device 114 via the high-speed wireless connection 1214 or connected to the server system 1204 via the network 1216. The server system 1204 may be one or more computing devices as part of a service or network computing system, for example, that includes a processor, a memory, and network communication interface to communicate over the network 1216 with the mobile device 114 and the head-wearable apparatus 116.

The mobile device 114 includes a processor and a network communication interface coupled to the processor. The network communication interface allows for communication over the network 1216, low-power wireless connection 1212, or high-speed wireless connection 1214. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1220. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1204, such as the user input device 1228, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1212 and high-speed wireless connection 1214 from the mobile device 114 via the low-power wireless circuitry 1234 or high-speed wireless circuitry 1232.

Machine Architecture

Figure 13:
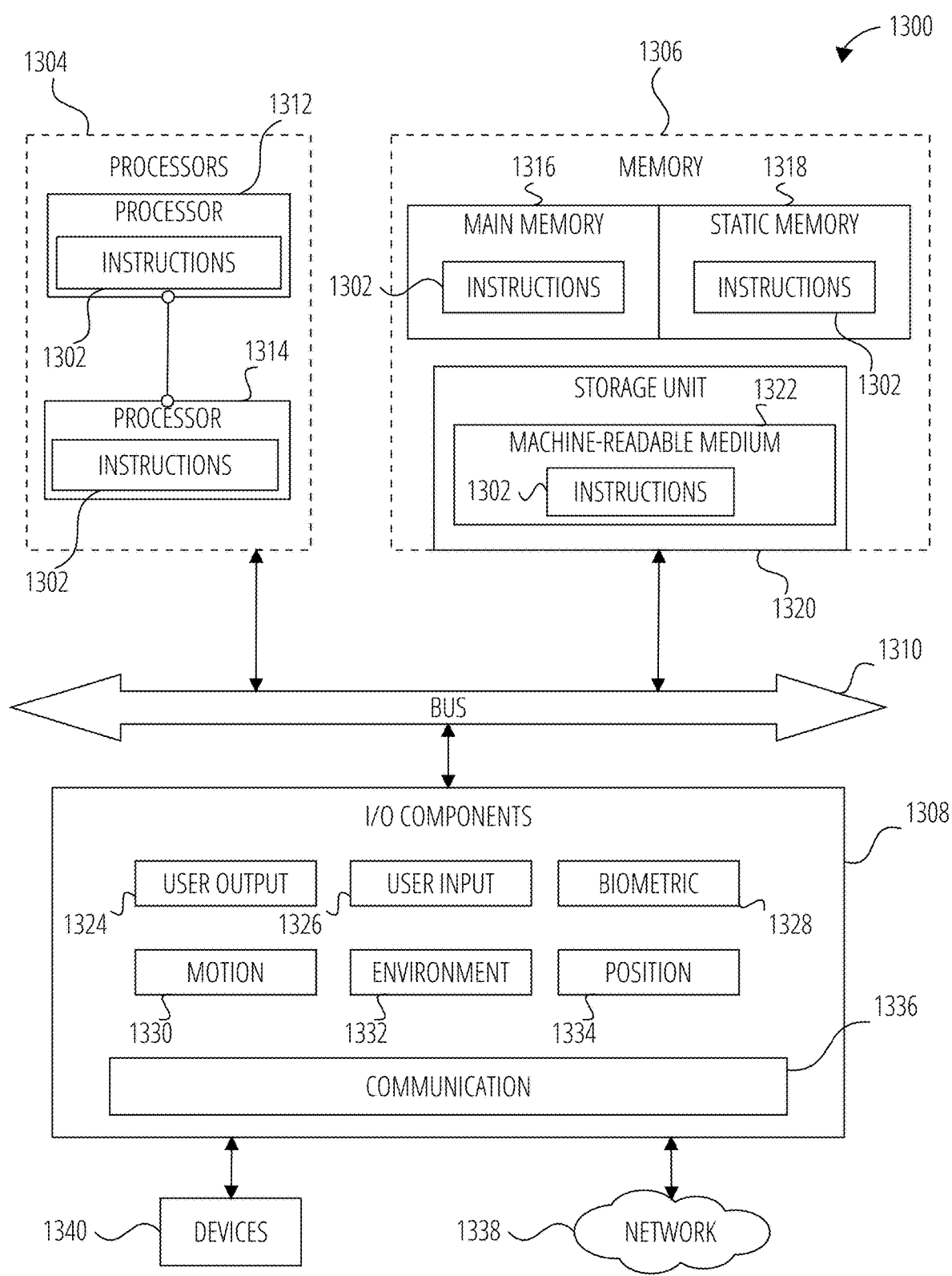
FIG. 13 is a diagrammatic representation of a machine in the form of a computer system within which a set of instructions may be executed to cause the machine to perform any one or more of the methodologies discussed herein, according to some examples.

FIG. 13 is a diagrammatic representation of the machine 1300 within which instructions 1302 (e.g., software, a program, an application, an applet, an app, or other executable code) for causing the machine 1300 to perform any one or more of the methodologies discussed herein may be executed. For example, the instructions 1302 may cause the machine 1300 to execute any one or more of the methods described herein. The instructions 1302 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1302, sequentially or otherwise, that specify actions to be taken by the machine 1300. Further, while a single machine 1300 is illustrated, the term "machine" shall also be taken to include a collection of machines that individually or jointly execute the instructions 1302 to perform any one or more of the methodologies discussed herein. The machine 1300, for example, may comprise the user system 102 or any one of multiple server devices forming part of the interaction server system 110. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1308, which may be configured to communicate with each other via a bus 1310. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1312 and a processor 1314 that execute the instructions 1302. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1316, a static memory 1318, and a storage unit 1320, both accessible to the processors 1304 via the bus 1310. The main memory 1306, the static memory 1318, and storage unit 1320 store the instructions 1302 embodying any one or more of the methodologies or functions described herein. The instructions 1302 may also reside, completely or partially, within the main memory 1316, within the static memory 1318, within machine-readable medium 1322 within the storage unit 1320, within at least one of the processors 1304 (e.g., within the processor's cache memory), or any suitable combination thereof, during execution thereof by the machine 1300.

The I/O components 1308 may include a wide variety of components to receive input, provide output, produce output, transmit information, exchange information, capture measurements, and so on. The specific I/O components 1308 that are included in a particular machine will depend on the type of machine. For example, portable machines such as mobile phones may include a touch input device or other such input mechanisms, while a headless server machine will likely not include such a touch input device. It will be appreciated that the I/O components 1308 may include many other components that are not shown in FIG. 13. In various examples, the I/O components 1308 may include user output components 1324 and user input components 1326. The user output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1308 may include biometric components 1328, motion components 1330, environmental components 1332, or position components 1334, among a wide array of other components. For example, the biometric components 1328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1330 include acceleration sensor components (e.g., accelerometer), gravitation sensor components, rotation sensor components (e.g., gyroscope).

The environmental components 1332 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple camera systems may include a wide camera, an ultra-wide camera, a telephoto camera, a macro camera, and a depth sensor, for example.

The position components 1334 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1308 further include communication components 1336 operable to couple the machine 1300 to a network 1338 or devices 1340 via respective coupling or connections. For example, the communication components 1336 may include a network interface component or another suitable device to interface with the network 1338. In further examples, the communication components 1336 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1340 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, location via detecting an NFC beacon signal that may indicate a particular location, and so forth.

The various memories (e.g., main memory 1316, static memory 1318, and memory of the processors 1304) and storage unit 1320 may store one or more sets of instructions and data structures (e.g., software) embodying or used by any one or more of the methodologies or functions described herein. These instructions (e.g., the instructions 1302), when executed by processors 1304, cause various operations to implement the disclosed examples.

The instructions 1302 may be transmitted or received over the network 1338, using a transmission medium, via a network interface device (e.g., a network interface component included in the communication components 1336) and using any one of several well-known transfer protocols (e.g., hypertext transfer protocol (HTTP)). Similarly, the instructions 1302 may be transmitted or received using a transmission medium via a coupling (e.g., a peer-to-peer coupling) to the devices 1340.

Software Architecture

Figure 14:
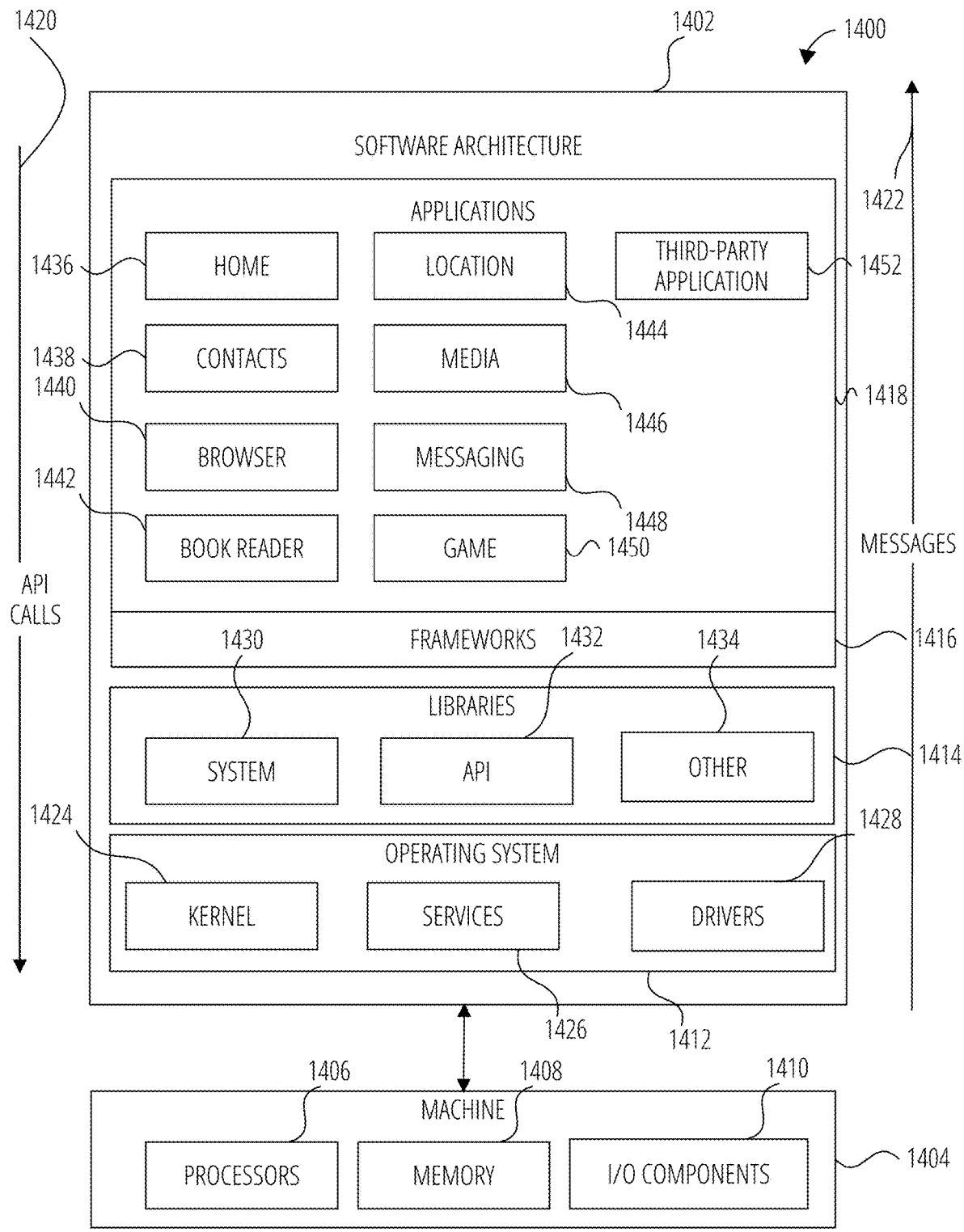
FIG. 14 is a block diagram showing a software architecture within which examples may be implemented.

FIG. 14 is a block diagram 1400 illustrating a software architecture 1402, which can be installed on any one or more of the devices described herein. The software architecture 1402 is supported by hardware such as a machine 1404 that includes processors 1406, memory 1408, and I/O components 1410. In this example, the software architecture 1402 can be conceptualized as a stack of layers, where each layer provides a particular functionality. The software architecture 1402 includes layers such as an operating system 1412, libraries 1414, frameworks 1416, and applications 1418. Operationally, the applications 1418 invoke API calls 1420 through the software stack and receive messages 1422 in response to the API calls 1420.

The operating system 1412 manages hardware resources and provides common services. The operating system 1412 includes, for example, a kernel 1424, services 1426, and drivers 1428. The kernel 1424 acts as an abstraction layer between the hardware and the other software layers. For example, the kernel 1424 provides memory management, processor management (e.g., scheduling), component management, networking, and security settings, among other functionalities. The services 1426 can provide other common services for the other software layers. The drivers 1428 are responsible for controlling or interfacing with the underlying hardware. For instance, the drivers 1428 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1414 provide a common low-level infrastructure used by the applications 1418. The libraries 1414 can include system libraries 1430 (e.g., C standard library) that provide functions such as memory allocation functions, string manipulation functions, mathematic functions, and the like. In addition, the libraries 1414 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1414 can also include a wide variety of other libraries 1434 to provide many other APIs to the applications 1418.

The frameworks 1416 provide a common high-level infrastructure that is used by the applications 1418. For example, the frameworks 1416 provide various graphical user interface (GUI) functions, high-level resource management, and high-level location services. The frameworks 1416 can provide a broad spectrum of other APIs that can be used by the applications 1418, some of which may be specific to a particular operating system or platform.

In an example, the applications 1418 may include a home application 1436, a contacts application 1438, a browser application 1440, a book reader application 1442, a location application 1444, a media application 1446, a messaging application 1448, a game application 1450, and a broad assortment of other applications such as a third-party application 1452. The applications 1418 are programs that execute functions defined in the programs. Various programming languages can be employed to create one or more of the applications 1418, structured in a variety of manners, such as object-oriented programming languages (e.g., Objective-C, Java, or C++) or procedural programming languages (e.g., C or assembly language). In a specific example, the third-party application 1452 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1452 can invoke the API calls 1420 provided by the operating system 1412 to facilitate functionalities described herein.

CONCLUSION

Examples of the present disclosure thus allow for automatic image quality evaluation. A machine learning framework is provided for evaluating text-guided, automatically generated images.

Examples described herein may lead to improved image quality and result in more efficient computing resource usage, e.g., by selecting higher quality images or models producing higher quality images, a system may reduce the number of image requests that typically need to be processed for a user to reach a satisfactory result. Examples may also allow for easier identification of model parameters that produce higher quality images.

Further, in some examples, an evaluation system may automatically compare a set of candidate images and select a subset for presentation on a user device based on predicted quality, eliminating the need for the user device to download or store the full set of initial candidates, possibly freeing up memory and reducing processing requirements.

In some examples, a quality metric such as visual realism is an important aspect of evaluating generative content, but may be difficult to assess (e.g., due to different styles applied to generated images). Using an automated system as described in examples of the present disclosure may facilitate assessment of the quality of such images, e.g., through the use of a uniform, diverse set of prompts and an automated scoring and evaluation process.

When the effects in this disclosure are considered in aggregate, one or more of the methodologies described herein may obviate a need for certain efforts or resources that otherwise would be involved in automated image generation or quality evaluations. Computing resources used by one or more machines, databases, or networks may be more efficiently utilized or even reduced, e.g., as a result of a user not having to manually modify and re-submit prompts in an attempt to obtain better images or images that are more closely aligned to what the user has in mind. Examples of such computing resources may include processor cycles, network traffic, memory usage, graphics processing unit (GPU) resources, data storage capacity, power consumption, and cooling capacity.

Further, while examples described herein focus on image generation and evaluation of images, it will be appreciated that techniques described herein may be applied to video generation and the evaluation of such videos (e.g., automatically generating a video, comprising a sequence of digital image frames, based on an input prompt and/or automatically evaluating and ranking such videos or the models used to generate them).

Examples described herein refer to embeddings. An embedding is a mathematical representation of a feature or input data that allows it to be processed by, or facilitates processing thereof, by a machine learning algorithm. In some examples, an embedding is a mapping of high-dimensional input data to a lower-dimensional space, where the data can be more easily processed. It should be appreciated that, in some examples, where references are made to encoding text, e.g., creating embeddings, pre-processing steps may be carried out automatically (or in some cases manually) prior to such encoding. This may include pre-processing actions such as removing stop words, stemming, or lowercasing.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Glossary

"Carrier signal" refers, for example, to any intangible medium that is capable of storing, encoding, or carrying instructions for execution by the machine and includes digital or analog communications signals or other intangible media to facilitate communication of such instructions.

Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"User device" refers, for example, to a device accessed, controlled, or owned by a user and with which the user interacts to perform an action, or an interaction with other users or computer systems.

What is claimed is:

1. A system comprising:
a memory that stores instructions; and
one or more processors configured by the instructions to perform operations comprising:
accessing a first set of images generated by a first automated image generator and a second set of images generated by a second automated image generator, the first set of images and the second set of images having been automatically generated based on a first text prompt;
generating, by a first machine learning model that is trained to evaluate image quality using a first quality metric, a first quality indicator for each image in the first set of images and for each image in the second set of images;
generating, by a second machine learning model that is trained to evaluate image quality using a second quality metric, a second quality indicator for each image in the first set of images and for each image in the second set of images;
automatically selecting, based on the first quality indicators and the second quality indicators, a first image from the first set of images and a second image from the second set of images;
generating, based on an automatic comparison between the first image and the second image, a first ranking of the first automated image generator and the second automated image generator; and
causing presentation, on a device, of ranking data generated at least partially from the first ranking.

2. The system of claim 1, wherein the first automated image generator is a first text-to-image machine learning model, and the second automated image generator is a second text-to-image machine learning model.

3. The system of claim 1, the operations further comprising, prior to the accessing the first set of images:
generating, by the first automated image generator, the first set of images.

4. The system of claim 3, the operations further comprising, prior to the accessing the second set of images:
generating, by the second automated image generator, the second set of images.

5. The system of claim 1, wherein the first quality indicator and the second quality indicator are different, and the first quality indicator and the second quality indicator are each one of an aesthetic quality score, an alignment score, or a visual realism score.

6. The system of claim 5, the operations further comprising:
automatically determining, based on the respective first quality indicators and second quality indicators, a combined score for each image in the first set of images and a combined score for each image in the second set of images, wherein the first image has a highest combined score from among the first set of images and the second image has a highest combined score from among the second set of images.

7. The system of claim 5, wherein the aesthetic quality score for each image is generated by a Multi-Layer Perceptron (MLP) neural network.

8. The system of claim 5, wherein generation of the alignment score for each image comprises encoding the image and the first text prompt to obtain respective vectors, and automatically measuring a similarity between the respective vectors using a cosine similarity method.

9. The system of claim 5, wherein the visual realism score for each image is automatically generated using a Visual Question Answering (VQA) machine learning model.

10. The system of claim 9, wherein generating the visual realism score for each image further comprises automatically generating a prediction of whether the image includes one or more artifacts.

11. The system of claim 1, the operations further comprising:
generating, by a third machine learning model that is trained to evaluate image quality using a third quality metric, a third quality indicator for each image in the first set of images and for each image in the second set of images, wherein the first image and the second image are selected based on the first quality indicators, the second quality indicators, and the third quality indicators.

12. The system of claim 11, wherein the first quality indicator, the second quality indicator, and the third quality indicator are different, and the first quality indicator, the second quality indicator and the third quality indicator are each one of an aesthetic quality score, an alignment score, or a visual realism score.

13. The system of claim 12, the operations further comprising:
automatically determining, based on the respective first quality indicators, second quality indicators and third quality indicators, a combined score for each image in the first set of images and a combined score for each image in the second set of images, wherein the first image has a highest combined score from among the first set of images and the second image has a highest combined score from among the second set of images.

14. The system of claim 1, wherein the first ranking is based on an automatic comparison between the first quality indicator generated for the first image and the first quality indicator generated for the second image, and wherein the first quality metric is one of aesthetic quality, alignment, or visual realism.

15. The system of claim 14, the operations further comprising:
generating, based on an automatic comparison between the second quality indicator generated for the first image and the second quality indicator generated for the second image, a second ranking of the first automated image generator and the second automated image generator, the ranking data being generated at least partially from the first ranking and the second ranking, wherein the second quality metric differs from the first quality metric and is one of: aesthetic quality, alignment, or visual realism.

16. The system of claim 3, wherein the first automated image generator is a text-to-image machine learning model, and wherein the operations further comprise:
training the text-to-image machine learning model on a training data set comprising a plurality of training records, each training record comprising a training image and at least one corresponding text description for the training image.

17. The system of claim 1, the operations further comprising:
receiving, from a user device associated with a user, an image generation request comprising the first text prompt;
selecting, based on the automatic comparison between the first image and the second image, one of the first image or the second image as a selected image; and
causing presentation of the selected image on the user device.

18. The system of claim 1, the operations further comprising:
accessing a third set of images generated by the first automated image generator and a fourth set of images generated by the second automated image generator, the third set of images and the fourth set of images having been automatically generated based on a second text prompt;
generating, by the first machine learning model, a first quality indicator for each image in the third set of images and for each image in the fourth set of images;
generating, by the second machine learning model, a second quality indicator for each image in the third set of images and for each image in the fourth set of images;
automatically selecting, based on the first quality indicators and the second quality indicators for the third set of images and the fourth set of images, a third image from the third set of images and a fourth image from the fourth set of images; and
generating, based on an automatic comparison between the third image and the fourth image, a third ranking of the first automated image generator and the second automated image generator, wherein the ranking data is generated at least partially from the first ranking and the third ranking.

19. A method comprising:
accessing, by one or more processors, a first set of images generated by a first automated image generator and a second set of images generated by a second automated image generator, the first set of images and the second set of images having been automatically generated based on a first text prompt;
generating, by the one or more processors and using a first machine learning model that is trained to evaluate image quality using a first quality metric, a first quality indicator for each image in the first set of images and for each image in the second set of images;
generating, by the one or more processors and using a second machine learning model that is trained to evaluate image quality using a second quality metric, a second quality indicator for each image in the first set of images and for each image in the second set of images;
automatically selecting, by the one or more processors, based on the first quality indicators and the second quality indicators, a first image from the first set of images and a second image from the second set of images;
generating, by the one or more processors, based on an automatic comparison between the first image and the second image, a first ranking of the first automated image generator and the second automated image generator; and causing presentation, on a device, of ranking data generated at least partially from the first ranking.

20. A non-transitory computer-readable storage medium, the computer-readable storage medium including instructions that when executed by at least one processor, cause the at least one processor to perform operations comprising:
- accessing a first set of images generated by a first automated image generator and a second set of images generated by a second automated image generator, the first set of images and the second set of images having been automatically generated based on a first text prompt;
- generating, by a first machine learning model that is trained to evaluate image quality using a first quality metric, a first quality indicator for each image in the first set of images and for each image in the second set of images;
- generating, by a second machine learning model that is trained to evaluate image quality using a second quality metric, a second quality indicator for each image in the first set of images and for each image in the second set of images;
- automatically selecting, based on the first quality indicators and the second quality indicators, a first image from the first set of images and a second image from the second set of images;
- generating, based on an automatic comparison between the first image and the second image, a first ranking of the first automated image generator and the second automated image generator; and
- causing presentation, on a device, of ranking data generated at least partially from the first ranking.

* * * * *